(12) United States Patent
Toll

(10) Patent No.: US 10,836,448 B2
(45) Date of Patent: *Nov. 17, 2020

(54) BICYCLE SEAT WITH VENTS

(71) Applicant: ISM Saddles, LLC, Lutz, FL (US)

(72) Inventor: Steven G. Toll, Lutz, FL (US)

(73) Assignee: ISM Saddles, LLC, Lutz, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,593

(22) Filed: Apr. 5, 2019

(65) Prior Publication Data

US 2019/0233042 A1    Aug. 1, 2019

Related U.S. Application Data

(63) Continuation of application No. 15/685,720, filed on Aug. 24, 2017, now Pat. No. 10,358,181.

(Continued)

(51) Int. Cl.
*B62J 1/10* (2006.01)
*B62J 1/00* (2006.01)
(Continued)

(52) U.S. Cl.
CPC .............. *B62J 1/18* (2013.01); *B62J 1/002* (2013.01); *B62J 1/08* (2013.01); *B62J 1/007* (2013.01)

(58) Field of Classification Search
CPC ... B62J 1/007; B62J 1/002; B62J 1/005; B62J 1/00; B62J 1/10; B62J 1/08
See application file for complete search history.

(56) References Cited

U.S. PATENT DOCUMENTS 642,191 A    1/1890  Wright
464,653 A    12/1891 Latta
(Continued)

FOREIGN PATENT DOCUMENTS

EP    1444127    11/2004
EP    2910458    8/2015
(Continued)

OTHER PUBLICATIONS

U.S. Appl. No. 29/635,828, filed Aug. 8, 2019 with the following characterization: Syncros, 2017 Syncros Catalogue: Precision Bicycle Products, p. 008 (Nov. 13, 2016), [online], [site visited Jul. 29, 2019]. Available from internet, <URL: Retrieved from https://issuu.com/rideonscott/docs/2017_catalogue_syncros_en_lo.
(Continued)

*Primary Examiner* — Shin H Kim
(74) *Attorney, Agent, or Firm* — Ackerman LLP; Peter A. Chiabotti

(57) ABSTRACT

According to one embodiment, a bicycle seat includes a frame having a front end section, a medial section, and a rear end section. The front end section extends forward from the medial section, and the rear end section extends aft from the medial section. The bicycle seat also includes a first vent positioned in a first side portion of the rear end section, and a second vent positioned in a second side portion of the rear end section. The first vent defines a first passageway that extends through the first side portion of the rear end section. The second vent defines a second passageway that extends through the second side portion of the rear end section.

20 Claims, 17 Drawing Sheets

Related U.S. Application Data

(60) Provisional application No. 62/380,163, filed on Aug. 26, 2016.

(51) Int. Cl.
  *B62J 1/18* (2006.01)
  *B62J 1/08* (2006.01)

(56) References Cited

U.S. PATENT DOCUMENTS

| | | |
|---|---|---|
| 532,444 A | 1/1895 | Christy |
| D24,139 S | 3/1895 | Christy |
| 537,375 A | 4/1895 | Wright et al. |
| 568,626 A | 9/1896 | Pierce et al. |
| 570,497 A | 11/1896 | Pattison |
| 572,062 A | 11/1896 | Peck |
| D27,616 S | 8/1897 | Rusch |
| D28,433 S | 3/1898 | Hollenbeck |
| D28,434 S | 3/1898 | Hollenbeck |
| 602,732 A | 4/1898 | Craig |
| 605,151 A | 6/1898 | Twist |
| 608,682 A | 8/1898 | Jamieson |
| 612,552 A | 10/1898 | Standeford |
| 612,972 A | 10/1898 | Leech |
| D29,719 S | 11/1898 | Leech et al. |
| 619,204 A | 2/1899 | Moore |
| 622,357 A | 4/1899 | Hitchcock et al. |
| 623,238 A | 4/1899 | Davis |
| 629,956 A | 8/1899 | Craig |
| 635,598 A | 10/1899 | Rowe |
| 654,720 A | 7/1900 | Engelbert |
| 701,390 A | 6/1902 | Provoost |
| 872,124 A | 11/1907 | Hammaren |
| 1,462,976 A | 9/1922 | Mesinger |
| 1,538,542 A | 2/1924 | Blake |
| 1,858,477 A | 5/1932 | Blake |
| D106,117 S | 5/1937 | Kraeft |
| D213,488 S | 3/1969 | Golden |
| 3,844,611 A | 10/1974 | Young |
| D237,123 S | 10/1975 | Hogkvist |
| 4,429,915 A | 2/1984 | Flager |
| 4,451,083 A | 5/1984 | Marchello |
| 4,898,422 A | 2/1990 | West |
| D306,378 S | 3/1990 | Bernardi |
| D315,646 S | 3/1991 | Hood |
| 4,999,068 A | 3/1991 | Chiarella |
| 5,011,222 A | 4/1991 | Yates et al. |
| 5,108,076 A | 4/1992 | Chiarella |
| 5,167,435 A | 12/1992 | Aldi |
| 5,676,420 A | 10/1997 | Kuipers et al. |
| 5,765,912 A | 6/1998 | Bontrager |
| 5,863,094 A | 1/1999 | Endo |
| 5,873,626 A | 2/1999 | Katz |
| D407,910 S | 4/1999 | Terry |
| D408,159 S | 4/1999 | Clutton |
| D409,009 S | 5/1999 | Toll et al. |
| D412,791 S | 8/1999 | Tsai |
| D416,394 S | 11/1999 | Minkow et al. |
| D417,560 S | 12/1999 | Tollefson et al. |
| 6,019,423 A | 1/2000 | Dodge et al. |
| 6,039,395 A | 3/2000 | Culbertson |
| D428,270 S | 7/2000 | Bigolin |
| D428,271 S | 7/2000 | Bigolin |
| D429,905 S | 8/2000 | White |
| D430,744 S | 9/2000 | Minkow et al. |
| D430,745 S | 9/2000 | Minkow et al. |
| 6,113,184 A | 9/2000 | Barnes |
| 6,139,098 A | 10/2000 | Carrillo |
| D433,827 S | 11/2000 | Kulpers |
| D434,235 S | 11/2000 | Kulpers |
| 6,193,309 B1 | 2/2001 | Gootter et al. |
| D439,756 S | 4/2001 | Bigolin |
| D440,779 S | 4/2001 | Bernardi |
| 6,224,151 B1 | 5/2001 | McMullen |
| D443,426 S | 6/2001 | Diaz |
| 6,244,655 B1 | 6/2001 | Minkow et al. |
| D446,032 S | 8/2001 | Arcieri |
| 6,290,291 B1 | 9/2001 | Kojima |
| D453,881 S | 2/2002 | Chuang |
| D454,258 S | 3/2002 | Yates |
| D456,157 S | 4/2002 | Yates |
| D456,623 S | 5/2002 | Yates |
| 6,402,236 B1 | 6/2002 | Yates |
| 6,422,647 B1 | 7/2002 | Turudich |
| 6,450,572 B1 | 9/2002 | Kuipers |
| D463,676 S | 10/2002 | Minkow et al. |
| 6,652,025 B2 | 11/2003 | Sylvester |
| 6,669,283 B2 | 12/2003 | Yu |
| 6,761,400 B2 | 7/2004 | Hobson |
| 6,783,176 B2 | 8/2004 | Ladson, III |
| 6,880,885 B2 | 4/2005 | Lan |
| D507,421 S | 7/2005 | Lawson |
| 6,957,857 B1 | 10/2005 | Lee |
| 7,025,417 B2 | 4/2006 | Cohen |
| D523,651 S | 6/2006 | Chao et al. |
| 7,077,469 B2 | 7/2006 | Farré |
| 7,104,600 B2 | 9/2006 | Scholz |
| 7,121,622 B1 | 10/2006 | Mendez |
| 7,374,517 B2 | 5/2008 | Lockett |
| D575,070 S | 8/2008 | Toll |
| 7,441,836 B2 | 10/2008 | Chen et al. |
| 7,478,871 B2 | 1/2009 | Pandozy |
| D590,160 S | 4/2009 | Hung |
| 7,537,281 B2 | 5/2009 | Riondato |
| D604,056 S | 11/2009 | Toll et al. |
| D604,057 S | 11/2009 | Toll |
| 7,699,391 B2 | 4/2010 | Riondato |
| D622,973 S | 9/2010 | Toll |
| 7,934,770 B2 | 5/2011 | Toll |
| D639,081 S | 6/2011 | Toll |
| D640,879 S | 7/2011 | Curran |
| 7,976,102 B2 | 7/2011 | Chang |
| D642,846 S | 8/2011 | Parish et al. |
| D658,396 S | 5/2012 | Sprouse, II |
| D677,479 S | 3/2013 | Toll |
| D684,780 S | 6/2013 | Toll |
| D684,781 S | 6/2013 | Toll |
| 8,480,169 B2 | 7/2013 | Bailie et al. |
| D688,051 S | 8/2013 | Toll |
| D688,052 S | 8/2013 | Toll |
| D688,477 S | 8/2013 | Toll |
| D688,478 S | 8/2013 | Toll |
| D688,479 S | 8/2013 | Toll |
| 8,845,018 B2 | 9/2014 | Toll |
| D720,548 S | 1/2015 | Yu |
| D720,939 S | 1/2015 | Toll |
| D722,446 S | 2/2015 | Toll |
| D724,329 S | 3/2015 | Toll |
| D724,330 S | 3/2015 | Toll |
| D753,925 S | 4/2016 | Toll |
| D753,926 S | 4/2016 | Smith et al. |
| D754,450 S | 4/2016 | Toll |
| D756,675 S | 5/2016 | Toll |
| D760,507 S | 7/2016 | Marcel |
| D762,073 S | 7/2016 | Toll |
| D764,820 S | 8/2016 | Toll |
| D764,821 S | 8/2016 | Toll |
| D764,822 S | 8/2016 | Toll |
| D767,909 S | 10/2016 | Toll |
| D767,910 S | 10/2016 | Toll |
| D767,911 S | 10/2016 | Toll |
| D769,007 S | 10/2016 | Toll |
| D769,008 S | 10/2016 | Toll |
| D769,631 S | 10/2016 | Toll |
| D774,790 S | 12/2016 | Toll |
| D774,791 S | 12/2016 | Toll |
| D778,079 S | 2/2017 | Porter et al. |
| D784,033 S | 4/2017 | Li |
| D786,573 S | 5/2017 | Toll |
| 9,718,509 B2 | 8/2017 | Toll |
| D802,947 S | 11/2017 | Toll |
| D802,948 S | 11/2017 | Toll |
| D802,949 S | 11/2017 | Toll |
| D803,594 S | 11/2017 | Toll |

(56) References Cited

U.S. PATENT DOCUMENTS

| | | | |
|---|---|---|---|
| D804,204 S | 12/2017 | Bigolin et al. | |
| D806,415 S | 1/2018 | Toll | |
| D809,810 S | 2/2018 | Pizarro | |
| D846,896 S | 4/2019 | Hain | |
| D846,897 S | 4/2019 | Toll | |
| D846,899 S | 4/2019 | Toll | |
| D846,900 S | 4/2019 | Toll | |
| D847,522 S | 5/2019 | Pruitt et al. | |
| 10,358,181 B2 | 7/2019 | Toll | |
| D856,013 S | 8/2019 | Jalkanen | |
| D856,014 S | 8/2019 | Jalkanen | |
| D875,411 S | 2/2020 | Bigolin | |
| D879,488 S | 3/2020 | Liu | |
| D887,731 S | 6/2020 | Kim | |
| 2002/0117880 A1 | 8/2002 | Ladson | |
| 2003/0025363 A1 | 2/2003 | Gaggiola | |
| 2003/0034678 A1 | 2/2003 | Farré | |
| 2003/0038515 A1 | 2/2003 | Martin et al. | |
| 2003/0067195 A1 | 4/2003 | Sylvester | |
| 2003/0071498 A1 | 4/2003 | Yu | |
| 2005/0006932 A1 | 1/2005 | Laidlaw | |
| 2007/0069557 A1 | 3/2007 | Toll | |
| 2007/0102970 A1 | 5/2007 | Wallace | |
| 2007/0200399 A1 | 8/2007 | Riondato | |
| 2007/0246978 A1 | 10/2007 | Yu | |
| 2007/0273184 A1 | 11/2007 | Garneau | |
| 2008/0265636 A1 | 10/2008 | Toll | |
| 2009/0079237 A1 | 3/2009 | Riondato | |
| 2009/0189421 A1* | 7/2009 | Yu | B62J 1/00 297/195.1 |
| 2010/0109392 A1 | 5/2010 | Toll | |
| 2011/0298253 A1 | 12/2011 | Toll | |
| 2012/0086246 A1 | 4/2012 | Belliveau | |
| 2012/0242119 A1* | 9/2012 | Bigolin | B62J 1/00 297/195.1 |
| 2015/0097401 A1 | 4/2015 | Toll | |
| 2015/0197171 A1* | 7/2015 | Bigolin | B62J 1/00 297/214 |
| 2015/0239515 A1 | 8/2015 | Toll | |
| 2017/0355410 A1* | 12/2017 | Yim | B62J 1/08 |

FOREIGN PATENT DOCUMENTS

| | | |
|---|---|---|
| FR | 796997 | 4/1936 |
| JP | 2007-186075 | 7/2007 |
| JP | 2008-509047 | 3/2008 |
| JP | 2011-143734 | 7/2011 |
| JP | 2012-162255 | 8/2012 |
| WO | 99/14103 | 3/1999 |
| WO | 2006015731 | 2/2006 |
| WO | 2007/038692 | 4/2007 |
| WO | 2014/035972 | 2/2011 |
| WO | 2013/134253 | 9/2013 |

OTHER PUBLICATIONS

Leibovitch et al., "The Vicious Cycling: Bicycling Related Urogenital Disorders", European Urology 47, pp. 277-287 (2005).
Randrup et al., "Bicycle Riding as a Cause for Erectile Dysfunction", www.medicalsexuality.org, pp. 26-27, (Nov. 2000).
Jeong et al., "Bicycle Saddle Shape affects penile blood flow", International Journal of Impotence Research, 14, 513-517 (2002).
Spears et al., "The Effect of Saddle Design on Stresses in the Perineum during Cycling", Medical Science Sports Exercise, vol. 35, No. 9, pp. 1620-1625 (2003).
Bressel et al., "Bicycle Seat Designs and Their Effect on Pelvic Angle, Trunk Angle, and Comfort", Medical Science Sports Exercise, vol. 35, No. 2, pp. 327-332 (2003).
Breda et al., and Adara Caruso, M.D., "Development of New Geometric Bicycle Saddle for the Maintenance of Genital—Perinea Vascular Perfusion," Journal of Sexual Medicine, vol. 2, Issue 5, pp. 605-611 (Sep. 2005).
Lowe et al., "Effect of Bicycle Saddle Designs on the Pressure to the Perineum of the Bicyclist", Medical Science Sports Exercise, vol. 36, No. 6, pp. 1055-1062 (2004).
Bressel et al., "Bicycle Seat Interface Pressure: Reliability, Validity, and Influence of Hand Position and Workload", Journal of Biomechanics, vol. 38, Issue 6, pp. 1325-1331 (Jun. 2005).
Bressel et al., "Influence of Bicycle Seat Pressure on compression of the perineum: a MRI Analysis," Journal of Biomechanics 40, pp. 198-202 (2007, Accepted Nov. 26, 2005).
U.S. Appl. No. 29/539,809, filed Jul. 21, 2016 with the following characterization: "Noseless Saddles—My Two Cents Worth." The Bike Noob., Jun. 30, 2011 [online], [retrieved on Jul. 8, 2016]. Retrieved from the Internet <URL: http://bikenoob.com/2011/06/30/noseless-saddles-my-two-cents-worth/>.
U.S. Appl. No. 29/539,809, filed Jul. 21, 2016 with the following characterization: "Saddles Part 3—ISM ADAMO." Bike Test Reviews. Apr. 5, 2013 [online], [retrieved on Jul. 8, 2016]. Retrieved from the Internet <URL: http://biketestreviews.com/saddles-part-3-ism-adamo/>.
U.S. Appl. No. 29/484,042, filed Jul. 29, 2014 with the following characterization: "Podium Imports ISM Saddles." Podium Imports., Feb. 20, 2013 [online], [retrieved on Jul. 19, 2014]. Retrieved from the Internet <URL: http://www.podiumimports.ca/shop-online/brand/ism-saddles/>.
U.S. Appl. No. 29/484,042, filed Jul. 29, 2014 with the following characterization: Alter, Lloyd. "No—Nose Bicycle Seats: Are They The Answer to Erectile Dysfunction and Prostate . . . " Tree Hugger., Sep. 17, 2010 [online], [retrieved on Jul. 19, 2014]. Retrieved from the Internet <URL: http://www.treehugger.com/bikes/no-nose-bicycle-seats-are-they-the-answer-to-erectile-dysfunction-and-prostate-problems-among-cyclists.html>.
U.S. Appl. No. 29/484,039, filed Jul. 29, 2014 with the following characterization: Demerly, Tom. "ISM Adamo Time Trial and Racing 2 Saddles: The Triathlon Saddle Evolved . . . " Just Tri Talk., Feb. 27, 2013 [online], [retrieved on Jul. 19, 2014]. Retrieved from the Internet <URL: http://justtritalk.com/ism-adamo-time-trial-and-racing-2-saddles-the-triathlon-saddle-evolved/>.
U.S. Appl. No. 29/539,813, filed Jul. 25, 2016 with the following characterization: "Noseless Bicycle Saddles—What You Need to Know." Electro Heart Beats., Mar. 15, 2014 [online], [retrieved on Jul. 8, 2016]. Retrieved from the Internet <URL: http://www.electroheartbeats.com/2014/03/noseless-bicycle-saddles-what-youneed.html>.
Patent Cooperation Treaty, "International Search Report and Written Opinion", issued in International Application No. PCT/US2017/048420, by European Searching Authority, document of 15 pages, dated Nov. 8, 2017.

* cited by examiner

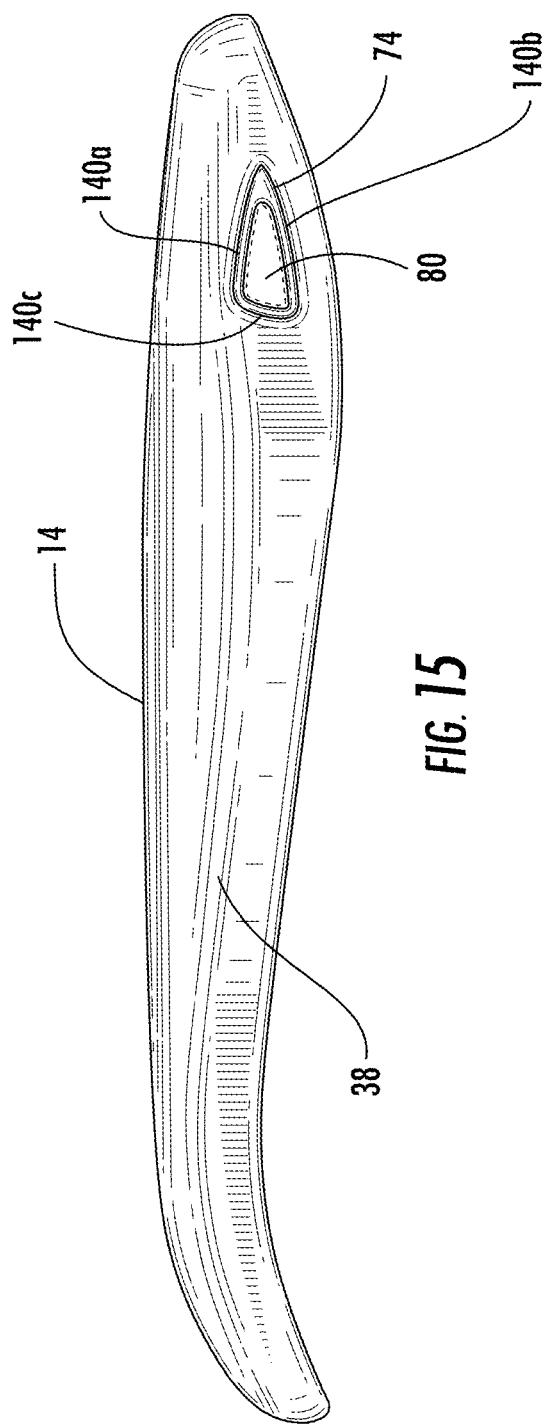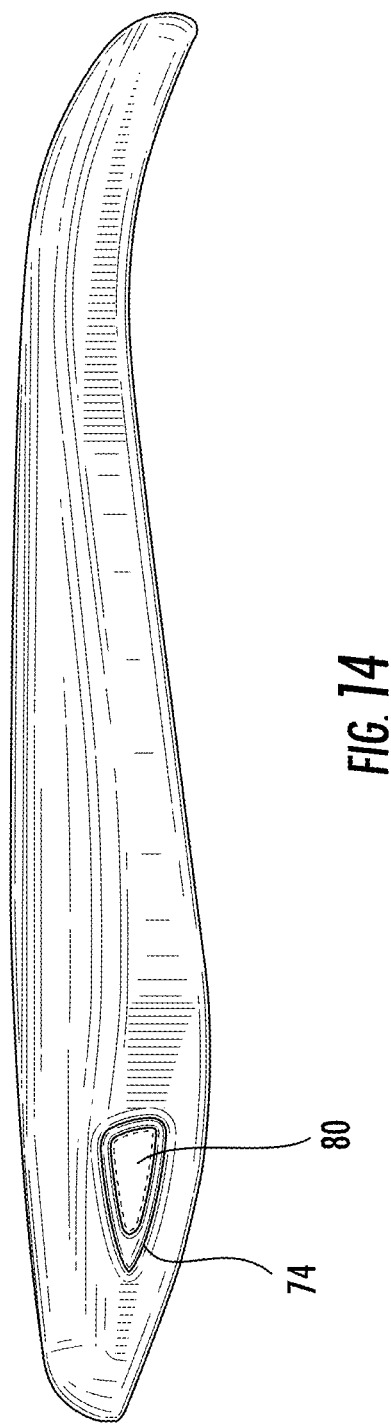
FIG. 15
FIG. 14

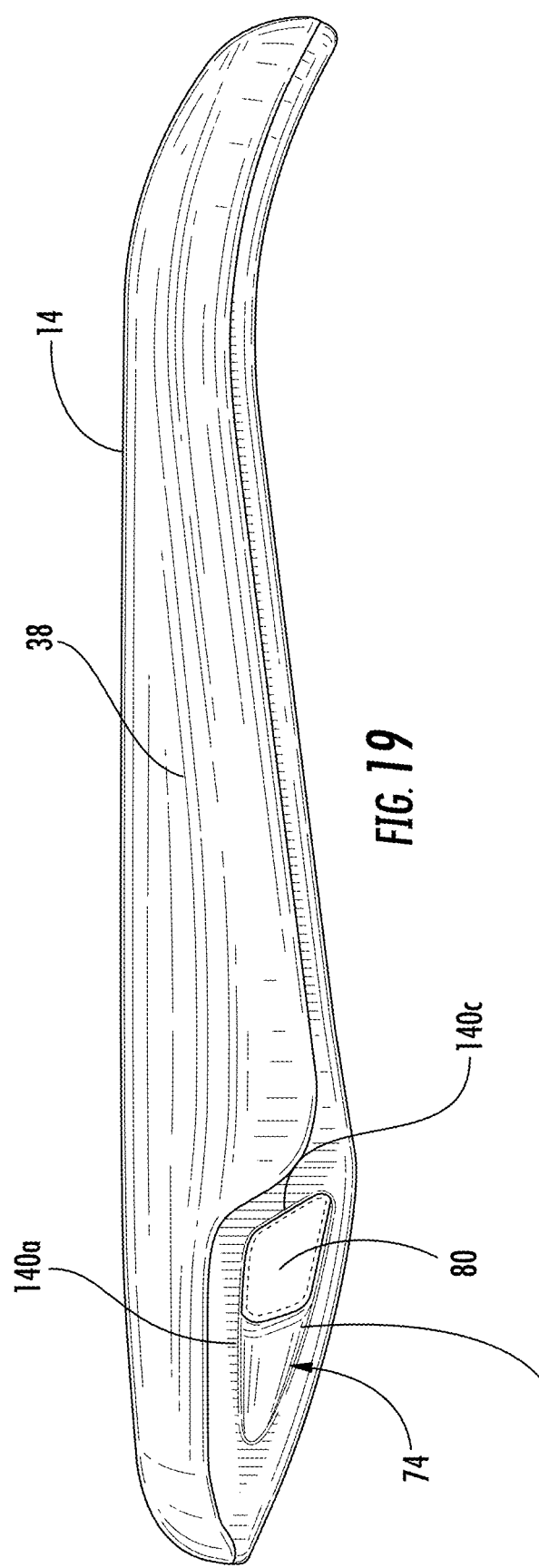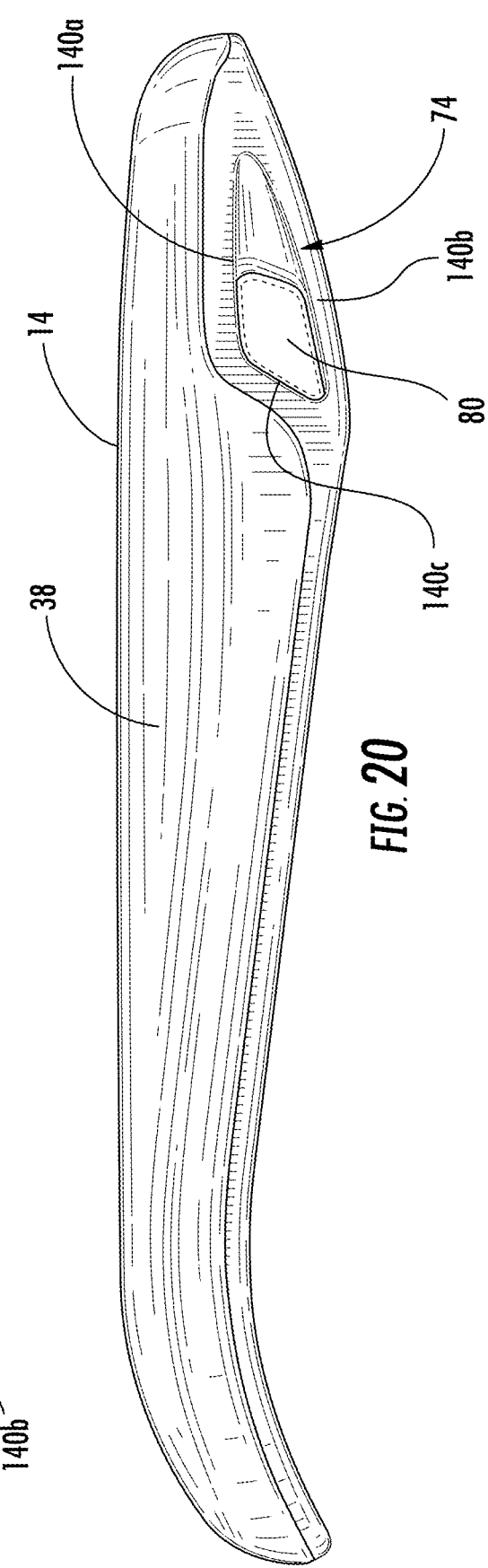

BICYCLE SEAT WITH VENTS

CROSS-REFERENCE TO RELATED APPLICATIONS

This application is a continuation of U.S. patent application Ser. No. 15/685,720, filed Aug. 24, 2017, which claims priority to U.S. Provisional Patent Application No. 62/380,163 filed Aug. 26, 2016, the entireties of which is incorporated herein by reference.

TECHNICAL FIELD

This disclosure relates generally to the field of bicycle seats and more specifically to a bicycle seat with vents.

BACKGROUND

Traditionally, a bicycle rider has utilized a bicycle seat to support the rider when the rider is positioned on the bicycle. These traditional bicycle seats, however, may be deficient.

SUMMARY

According to one embodiment, a bicycle seat includes a frame having a front end section, a medial section, and a rear end section. The front end section extends forward from the medial section, and the rear end section extends aft from the medial section. The bicycle seat also includes a first vent positioned in a first side portion of the rear end section, and a second vent positioned in a second side portion of the rear end section. The first vent defines a first passageway that extends through the first side portion of the rear end section. The second vent defines a second passageway that extends through the second side portion of the rear end section.

Certain embodiments of the disclosure may provide one or more technical advantages. For example, the vents (or the vents and vent frames) may create passageways that allow air to vent outside of the frame. Air that travels underneath the frame may be able to exit the frame through passageways created by the vents, which may enhance the aerodynamics of the bicycle seat. Additionally, vent frames may be coupled to the vents. These vent frames may couple (or assist in coupling) the cover to the frame. This coupling may further secure the cover to the frame, which may prevent the cover from moving (or reduce the amount of movement) when the cover is installed on the frame.

As another example, a bracket may be coupled to the bottom portion of the frame. The bracket may couple (or assist in coupling) the cover to the frame. This coupling by the bracket may eliminate the need to use staples (or other connectors) to attach the cover to the frame. Instead, the bracket may be able to attach the cover to the frame. Alternatively, even if one or more staples (or other connectors) are used to attach the cover to the frame, the bracket may be positioned over the staples, which may improve the aesthetics of the bicycle seat by hiding such staples from view.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE FIGURES

For a more complete understanding of the present disclosure and its features and advantages, reference is now made to the following description, taken in conjunction with the accompanying drawings, in which:

FIGS. 13-18 illustrate various views of another example of a bicycle seat;
FIGS. 19-20 are side views of another example of a bicycle seat.

DETAILED DESCRIPTION

Figure 1:
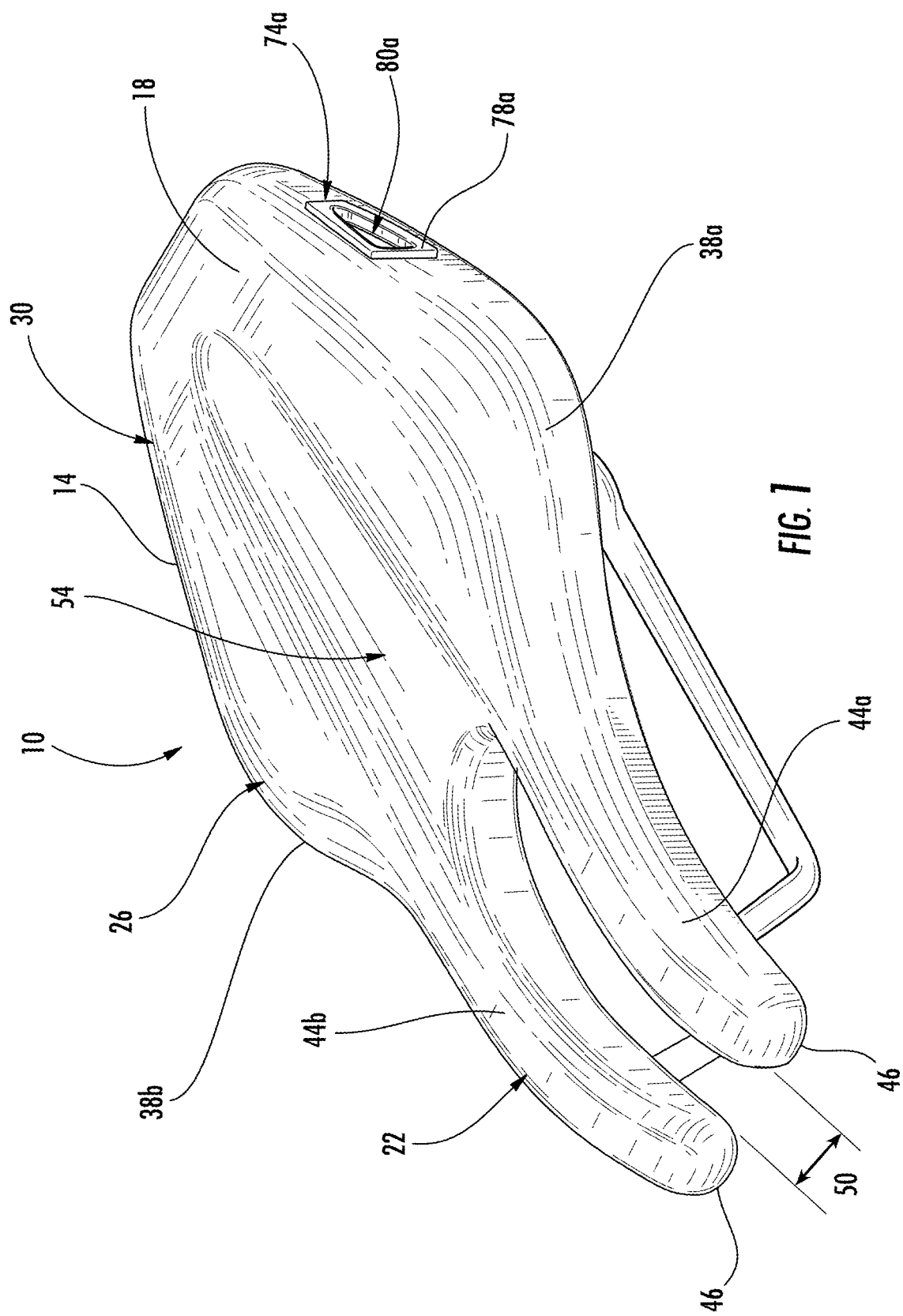
FIG. 1 is a perspective view of one example of a bicycle seat.

Examples of the present disclosure are best understood by referring to FIGS. 1-21 of the drawings, like numerals being used for like and corresponding parts of the various drawings.

FIGS. 1-12 illustrate examples of a bicycle seat 10 and/or one or more components for a bicycle seat. As illustrated, the bicycle seat 10 includes a frame 14 and a cover 18 which may cover all or a portion of the frame 14. The bicycle seat 10 further includes vents 74 positioned in a rear end section 30 of the frame 14, and vent frames 78 coupled in the vents 74. The vents 74 and vent frames 78 may create passageways 80 that allow air to vent outside of the frame 14. Air that travels underneath the frame 14 may be able to exit the frame 14 through passageways 80 created by the vents 74 and vent frames 78, which may enhance the aerodynamics of the bicycle seat 10. For example, the passageways 80 created by the vents 74 and vent frames 78 may provide for air to flow across the bottom of the frame 14 and then flow outside the frame 14 through the passageways 80. Additionally, the vent frames 78 may couple (or assist in coupling) the cover 18 to the frame 14. This coupling may further secure the cover 18 to the frame 14, which may prevent the cover 18 from moving (or reduce the amount of movement) when the cover 18 is installed on the frame 14.

Additionally, as is also illustrated, the bicycle seat 10 further includes a bracket 112. The bracket 112 may couple (or assist in coupling) the cover 18 to the frame 14. This coupling by the bracket 112 may eliminate the need to use staples (or other connectors) to attach the cover 18 to the frame 14. Instead, the bracket 112 may be able to attach the cover 18 to the frame 14. Alternatively, even if one or more staples (or other connectors) are used to attach the cover 18 to the frame 14, the bracket 112 may be positioned over the staples, which may improve the aesthetics of the bicycle seat 10 by hiding such staples from view.

The bicycle seat 10 may be bicycle seat for any type of bicycle. For example, the bicycle seat 10 may be a bicycle seat for a touring bicycle, a mountain bicycle, a city bicycle, a cruiser bicycle, a road bicycle, a BMX bicycle, any other bicycle, or any combination of the preceding.

The bicycle seat 10 may include a frame 14 that may support a rider when the rider is positioned on the bicycle. The frame 14 may have any shape and/or size. The shape and/or size of the frame 14 may vary based on the type of the bicycle that the bicycle seat 10 is used for. Also, the shape and/or size of the frame 14 may vary based on the characteristics and/or age of the person that will use the bicycle seat 10. The frame 14 may be made of (or otherwise constructed of) any material that may support a rider when the rider is positioned on the bicycle. For example, the frame 14 may be a one-piece plastic frame that is made of an injection molded polypropylene, polyurethane, polymer, ABS copolymer, nylon, molded plastic, carbon fiber, any other like material, any other plastic or polymer material, or any combination of the preceding. The frame 14 may be rigid, semi-rigid, or pliable.

Figure 2:
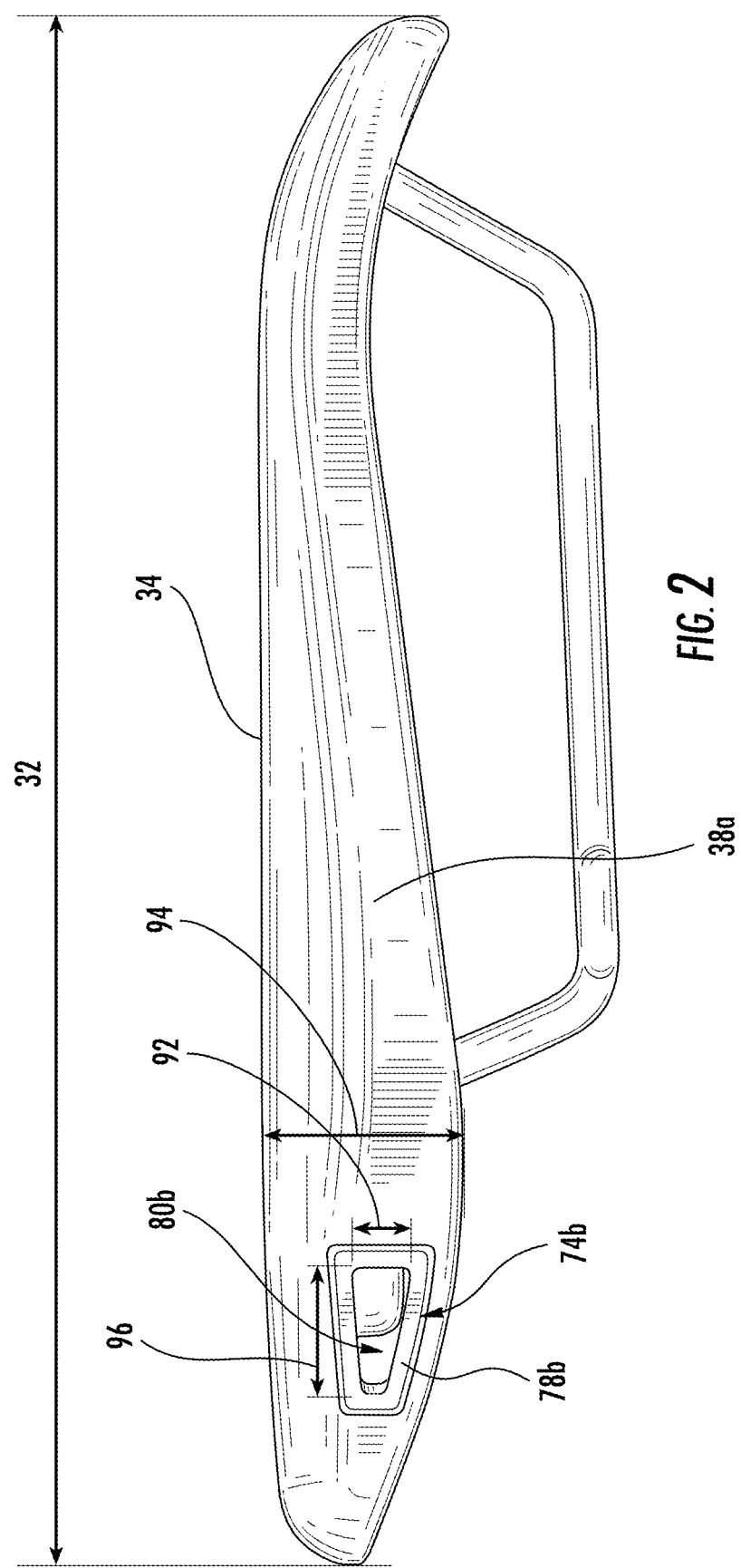
FIG. 2 is a side view of the bicycle seat of FIG. 1.
Figure 7:
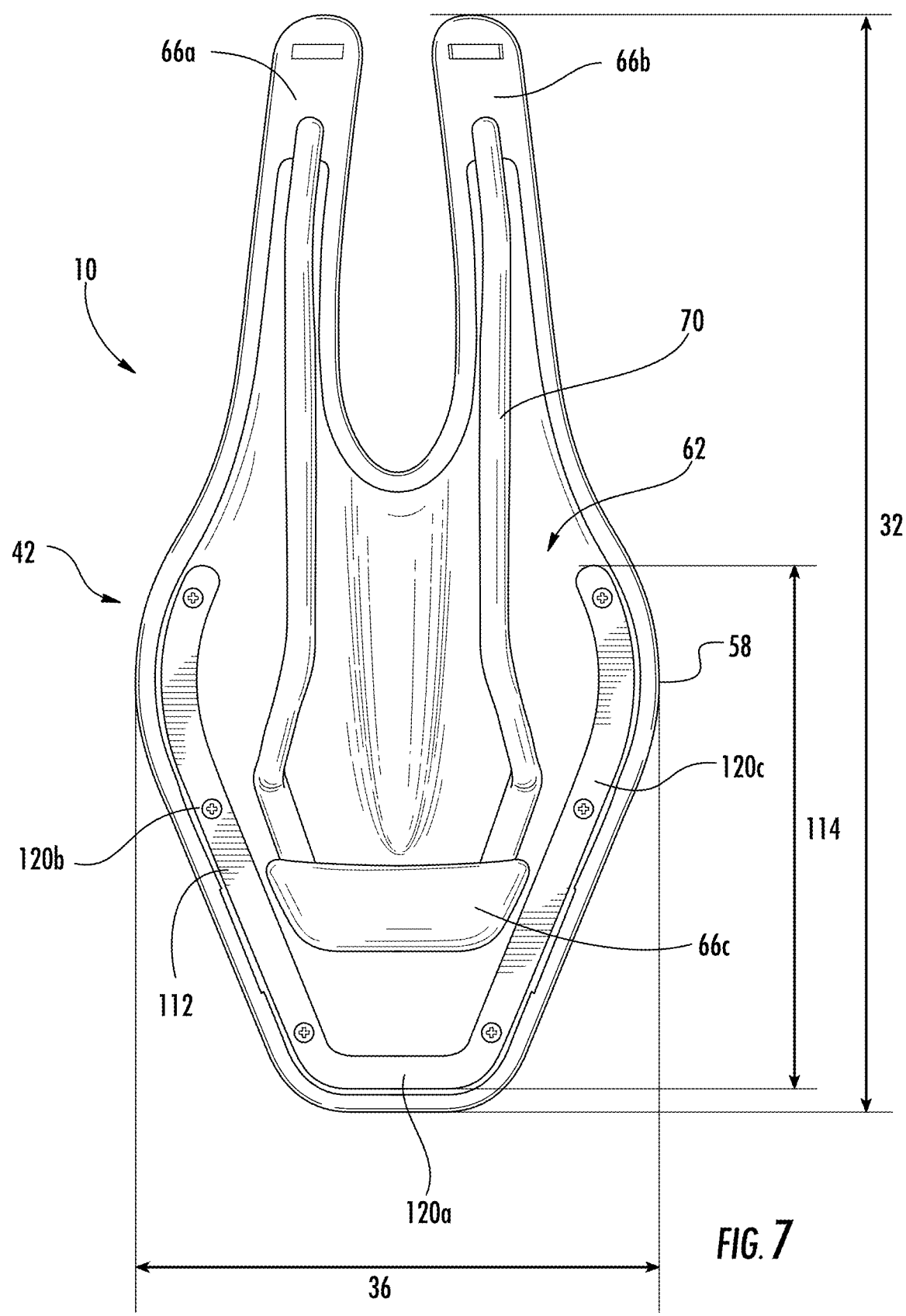
FIG. 7 is a bottom view of the bicycle seat of FIG. 1.

As is illustrated, the frame 14 may include a front end section 22, a medial section 26, and a rear end section (or tail section) 30. The frame 14 may also include a top portion 34, side portions 38 (side portion 38a and 38b), and a bottom portion 42, each of which may extend over all or a portion of each of the front end section 22, the medial section 26, and the rear end section 30. The frame 14 may widen from the front end section 22 to the back of the medial section 26, and may narrow thereafter to the rear end section 30. This configuration may define an overall length 32, an overall width 36, and a top height 94 of the frame 14 (as is illustrated in FIGS. 2 and 7). The overall length 32 may be approximately 240-260 mm, and in some samples, more preferably 250 mm. The overall width 36 may be approximately 117-127 mm, and in some samples, more preferably 120 mm. The top height 94 may be approximately 30-34, and in some examples, more preferably 32 mm. However, the overall length 32, the overall width 36, and/or the top height 94 may vary based on, for example, the type of the bicycle that the bicycle seat 10 is used for and/or the characteristics and/or age of the person that will use the bicycle seat 10.

Figure 6:
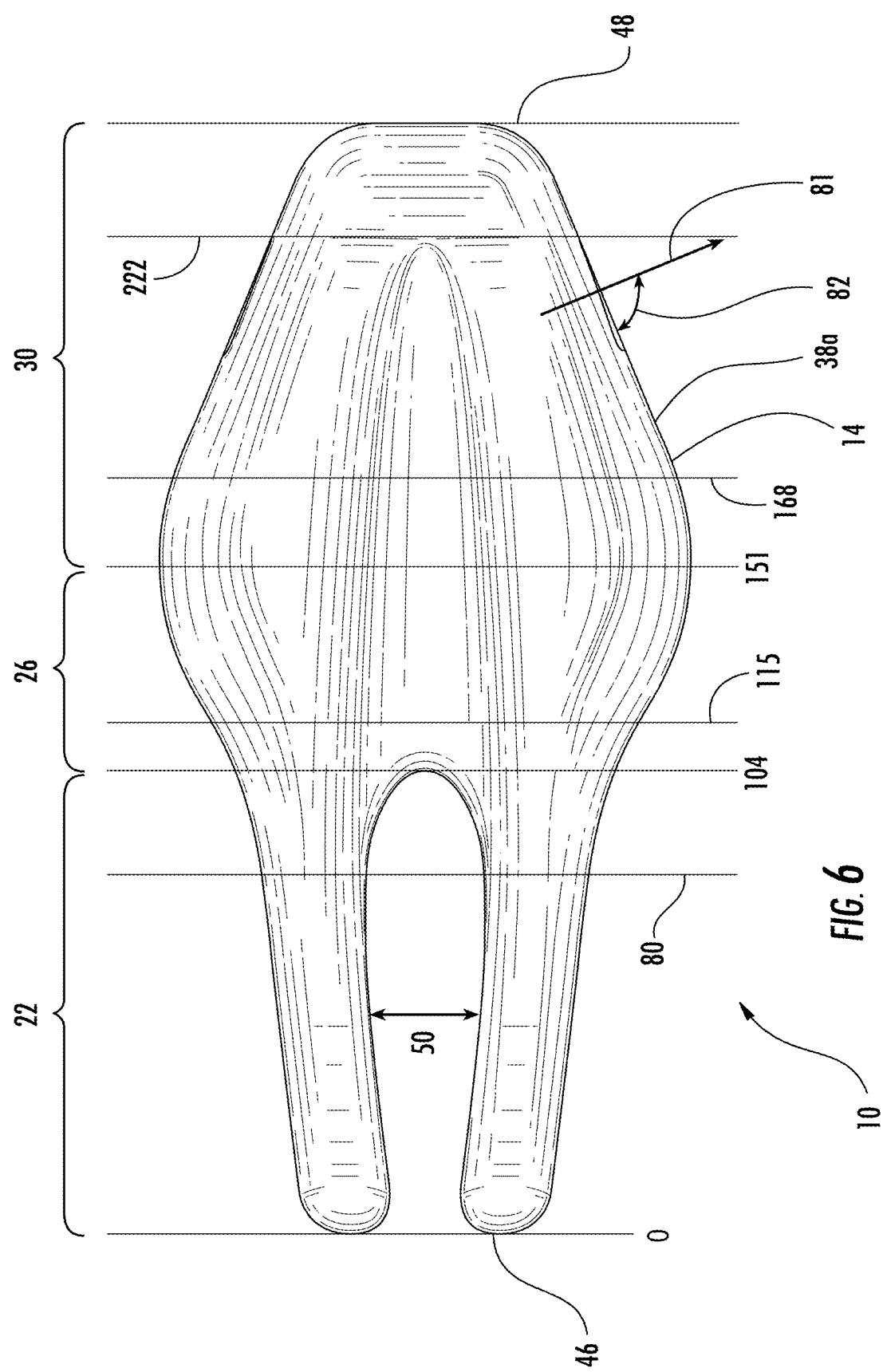
FIG. 6 is a top view of the bicycle seat of FIG. 1.

The front end section 22 may extend forward from the medial section 26. The front end section 22 may have any size. For example, as is illustrated in FIG. 6, the front end section 22 extends from approximately the end of the longitudinally extending gap 50 (shown as station 104) to the front portion 46 (shown as station 0) (e.g., station 104 to station 0 +/−5 mm). In some examples, the front end section 22 may have a length of approximately 100-110 mm, and in some examples, more preferably 104 mm. The front end section 22 may also have any shape. For example, the front end section 22 may include a single nose (or other protrusion) that extends from the medial section 26. According to the illustrated example, the front end section 22 may be a split nose section formed by two elongated protrusions 44a and 44b extending forward from the medial section 26 to the front surface 46. The elongated protrusions 44a and 44b may have any shape and/or size. As is illustrated, the elongated protrusions 44a and 44b have a substantially constant width (e.g., a constant width +/−5 mm).

The front end section 22 may further include the longitudinally extending gap 50 between the elongated protrusions 44. The longitudinally extending gap 50 may create a narrow space where the rider's perineal/genital area may be positioned without experiencing undue pressure or pain from the bicycle seat 10. The longitudinally extending gap 50 may be sized and/or contoured to provide pressure relief due to reduced contact of the perineum and/or genitalia of both male and female riders. For example, the longitudinally extending gap 50 may have a length (between the front portion 46 and the back of the longitudinally extending gap 50) of approximately 100-110 mm, and in some examples, more preferably 104 mm. Additionally, the longitudinally extending gap 50 may have a width (between the elongated protrusions 44) of approximately 10-18 mm (and in some examples, more preferably 16 mm) near the front portion 46 and may widen aft to approximately 22-30 mm (and in some examples, preferably 26 mm). The dimensions corresponding to the length, depth, and width of the longitudinally extending gap 50 may vary depending on the performance and comfort requirements of different riders and bicycles. These dimensions may be varied to accommodate different sized pelvic structures and intended uses.

Figure 3:
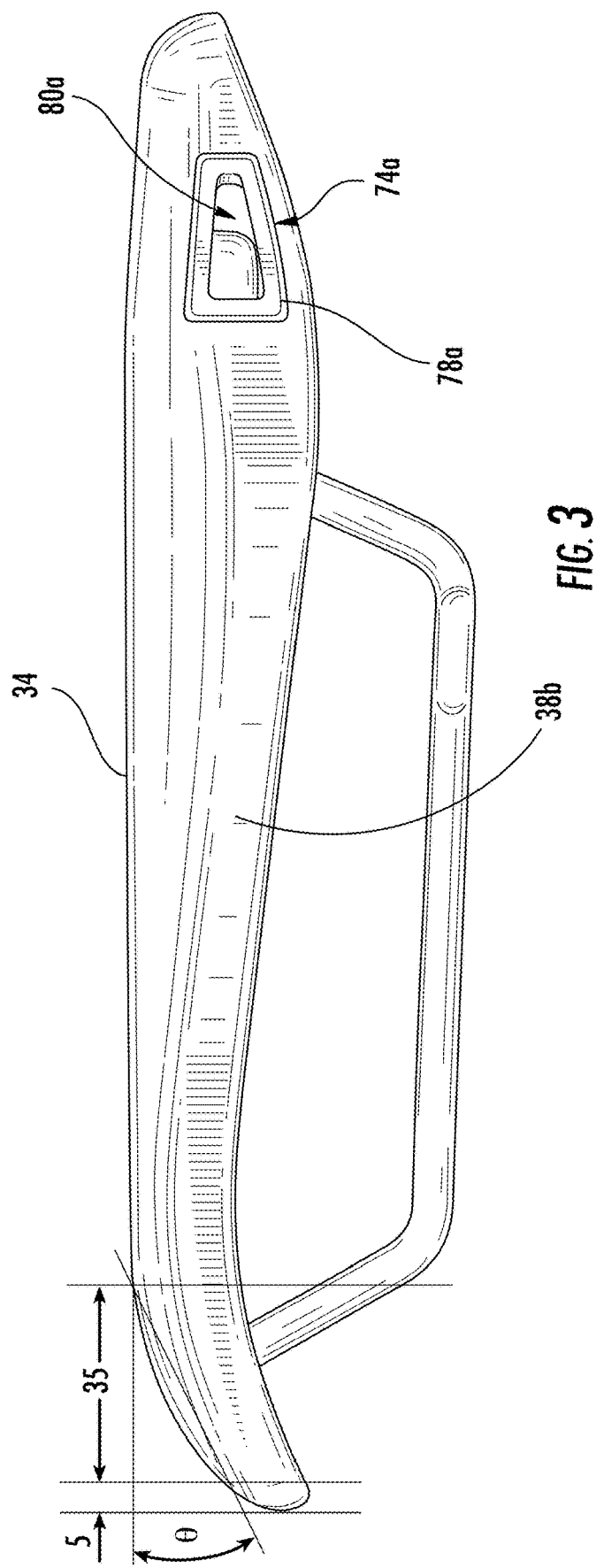
FIG. 3 is an opposite side view of the bicycle seat of FIG. 1.
Figure 4:
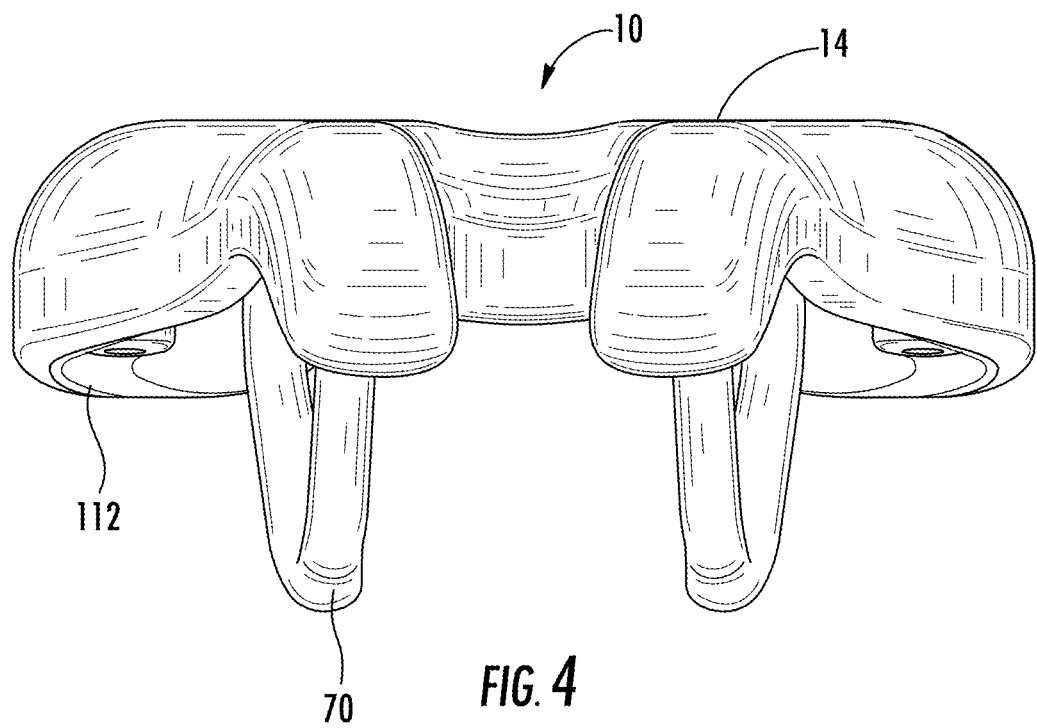
FIG. 4 is a front view of the bicycle seat of FIG. 1.
Figure 5:
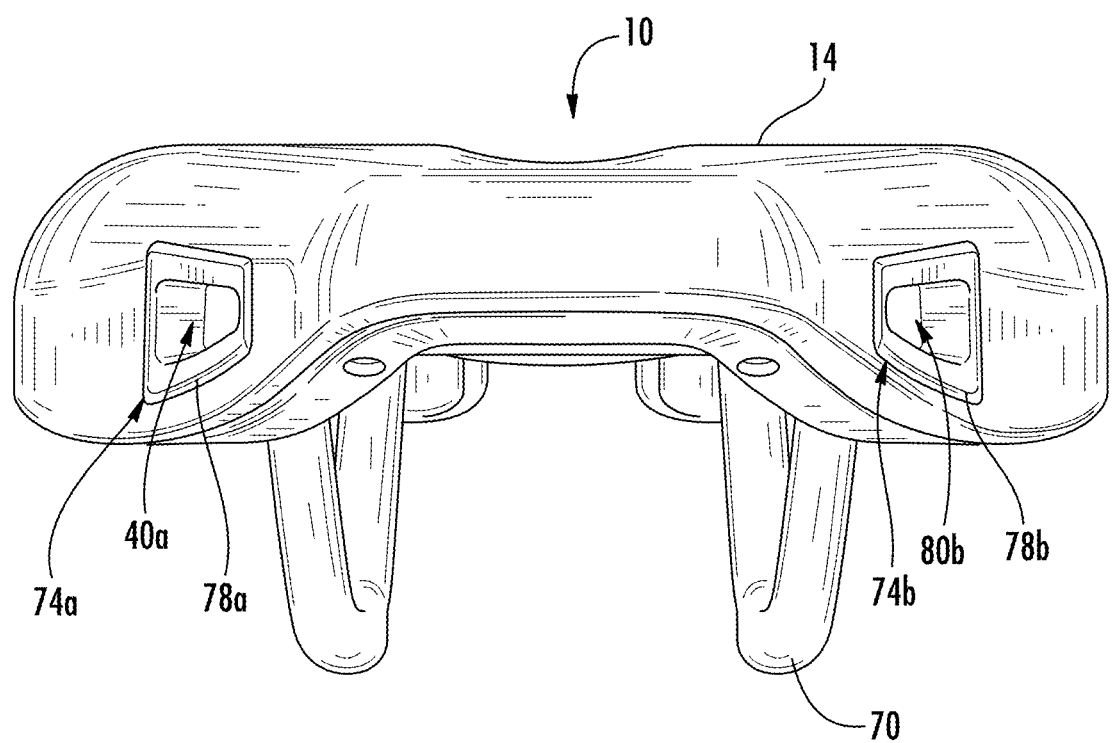
FIG. 5 is a rear view of the bicycle seat of FIG. 1.

The split nose section may extend relatively far forward, but may drop away or droop down. In some examples, the split nose section may droop down at an angle Ø (theta), as shown in FIG. 3. Examples of angle Ø may include 1-25 degrees or 1-40 degrees. Additionally (or alternatively), the split nose section may have circular curvature that cause the split nose section to droop down. The circular curvature may have any size. For example, the circular curvature may have an approximately 1.5-3.0 inch radius, and in some examples, more preferably a 2.5 inch radius. Having a drooped nose may reduce or eliminate pressure on the superficial perineal area which may be produced by conventional bicycles seats.

Each elongated protrusion 44 of the split nose section may be strategically positioned and padded to provide a cushioned pubis bone support surface having a substantially flat side profile.

A central channel (or central groove) 54 may separate the left side elongated protrusion 44a from the right side elongated protrusion 44b. The central channel 54 may have any size and/or shape. For example, the central channel 54 may have a length that extends from the elongated protrusions 44 to a portion of the rear end portion 30 (shown as station 222), a width that generally decreases from the elongated protrusions 44 to station 222, and a depth that decreases from the elongated protrusions 44 to station 222. In some examples, the central channel 54 may be approximately 112-160 mm long (and in some examples, more preferably 140 mm long), with a width of approximately 20-25 mm wide (and in some examples, more preferably 23 mm wide) at station 168, approximately 26-31 mm wide (and in some examples, more preferably 29 mm wide) at station 115, and approximately 25-29 mm wide (and in some examples, more preferably 27 mm wide) at station 80. In some examples, the bottom of the central channel 54 will slope downward from station 222 by approximately 2-7 degrees (and in some examples, more preferably 3.8 degrees) to station 80. Also, in some examples, the central channel 54 will have a radius of approximately 15-25 mm, and in some examples, more preferably 19 mm. This recessed central channel 54 provides, in some examples, additional relief to the perineal triangle, thus avoiding compression of the pudendal nerve and pudendal artery when the rider rides in the "slack". Additionally, although the central channel 54 is illustrated as having a particular shape, the central channel 54 may have a different shape, such as a rectangle, ellipse, pear, hyperbola, any other shape, or any combination of the preceding.

The longitudinally extending gap 50 and the central channel 54 may cooperate with each other to define an open space for relieving pressure on the pudendal arteries and nerves of a seat occupant. As such, in some examples, the seat will provide increased comfort during extended periods of use, due to a redistribution of the rider's weight.

The frame 14 may further include the medial section 26. The medial section 26 is an area of the frame 14 that supports a rider's ischial tuberosities. The medial section 26 may have any size. For example, as is illustrated in FIG. 6, the medial section extends from approximately the end of the longitudinally extending gap 50 (shown as station 104) to the widest portion of the frame 14 (shown as station 151) (e.g., station 104 to station 151+/−5 mm). In some examples, the medial section 26 may have a length of approximately 40-55 mm, and in some examples, more preferably 47 mm. The medial section 26 may also have any shape. As is illustrated, the sides of the medial section 26 curve gently toward the area where the elongated protrusions 44 begin to form, maintaining a width of, for example, at least approximately 80-90 mm, preferably 84 mm, at a station that is 50 mm forward of the widest point on the frame 14.

The frame 14 may further include the rear end section 30. The rear end section 30 may have any size. For example, as is illustrated in FIG. 6, the rear end section 30 extends from approximately the widest portion of the frame 14 (shown as station 151) to the back face 48 of the frame 14 (e.g., station 151 to the back face 48 of the frame 14+/−5 mm). In some examples, the rear end section 30 may have a length of approximately 90-110 mm, and in some examples, more preferably 99 mm. The rear end section 30 may also have any shape. For example, sides of the rear end section 30 may slope backwards from station 151 at an angle of approximately 40-50 degrees (and in some examples, more preferably 45 degrees) until they round off into the back face 48 of the frame 14. At the back face 48 of the frame 14, the rear end section 30 may have a width of approximately 40-56 mm wide (and in some examples, more preferably 48 mm wide).

As is illustrated in FIGS. 2-3, the top portion (or surface) 34 of the rear end section may be substantially flat. The rear end section 30 may be well-padded and relatively narrow compared to traditional seats. Furthermore, the widest point of the rear end section 30 may be approximately 115-122 mm.

The frame 14 may further include the top portion 34, side portions 38 (side portion 38a and 38b), and the bottom portion 42, each of which may extend over all or a portion of each of the front end section 22, the medial section 26, and the rear end section 30. The top portion 34 may be the portion of the frame 14 that faces a rider when the rider is sitting on the bicycle seat 10. The side portions 38 may extend from the top portion 34 to the bottom portion 42. The side portions 38 may have any shape that extends between the top portion 34 to the bottom portion 42. For example, the side portions 38 may be curved or flat.

The bottom portion 42 (illustrated in FIG. 7) may be the portion of the frame 14 that faces away from the rider when the rider is sitting on the bicycle seat 10. The bottom portion 42 may include a bottom lip 58 and a concave portion 62. The bottom lip 58 may surround the concave portion 62, and define an exterior shape of the bottom portion 42. The concave portion 62 may extend from the bottom of the bottom lip 58 towards the top portion 34 of the frame 14, thereby creating a concave shape within the frame 14. This concave portion 62 may reduce the amount of material used to create the frame 14, which may reduce the weight of the frame 14.

The bottom portion 42 of the frame 14 may further include connection pieces 66 (e.g., connection pieces 66a, 66b, and 66c), as is illustrated in FIG. 7. Connection pieces 66 may couple attachment rail 70 to the frame 14. For example, first ends of the attachment rail 70 may be positioned (and coupled) within connection pieces 66a and 66b (located on the elongated protrusions 44a and 44b, for example), and a second end of the attachment rail 70 may be positioned (and coupled) within connection piece 66c (located on the rear end section 30, for example). The connection pieces 66 may have any size and/or shape. Furthermore, the connection pieces 66 may be formed integral with the frame 14.

Although the attachment rail 70 is illustrated in FIG. 7 as being coupled to the frame 14 by connection pieces 66, the attachment rail 70 may be coupled to the frame 14 in any manner. For example, the attachment rail 70 may be coupled to the frame 14 in any manner that complies with (or otherwise satisfies) United States safety standards, European safety standards, and/or any other safety standards. In some examples, first ends of the attachment rail 70 may be pushed into a round female opening in each of the elongated protrusions 44a and 44b. Furthermore, the second end of the attachment rail 70 may be pushed into (or coupled) to any orifice or opening positioned on the rear end section 30.

The attachment rail 70 may be used to mount the frame 14 to a bicycle, and may be any device for mounting the frame 14 to the bicycle. As is illustrated, the attachment rail 70 is a single rail that includes two raised portions for attachment to the bicycle. In some examples, the attachment rail may be multiple rails (such as two rails) that collectively form the attachment rail 70. Furthermore the attachment rail 70 may have any shape and/or size that allows for mounting the frame 14 to the bicycle. The attachment rail 70 may be made of (or constructed of) any material that may provide a secure attachment of the frame 14 to the bicycle. For example, the attachment rail 70 may be made of carbon fiber, a chromium nitride/titanium (CrN/Ti) alloy, any other metal or metal alloy, or any combination of the preceding.

As is discussed above, the bicycle seat 10 may further include a cover 18 that may cover all or a portion of the frame 14. The cover 18 may be any outerwear surface. For example, the cover 18 may be made of (or otherwise constructed of) leather, plastic, vinyl, cloth, any other outerwear material, or any combination of the preceding. The cover 18 may be positioned on the frame 14 so as to cover the top portion 34 of the frame 14. The cover 18 may further cover the side portions 38 of the frame 14. Additionally, the cover 18 may extend over the bottom lip 58 of the bottom portion 42 and into the concave portion 62. At (or near) the intersection between the bottom of the bottom lip 58 and the concave portion 62, for example, the cover 18 may be coupled to the frame 14. The cover 18 may be coupled to the frame using one or more staples (or other connectors), the vent frames 78 (discussed below), the bracket 112 (discussed below), an adhesive, any other manner of attachment, or any combination of the preceding.

The bicycle seat 10 may further include one or more layers of cushion positioned between the frame 14 and the cover 18. For example, the bicycle seat 10 may include a flexible and resisting material positioned between the frame 14 and the cover 18 so as to form soft cushion lobes in strategically placed ridges to support the pelvic bones of the rider. As another example, the bicycle seat 10 may include a high-density, dual density, or memory foam padding positioned between the frame 14 and the cover 18.

As a further example, the bicycle seat 10 may include a cushioning gel layer positioned between the frame 14 and the cover 18. The cushioning gel layer may provide cushioning for any appreciable lateral movement(s) relative to the frame 14, and be of a thickness and a location which permits only limited up and down deflection. The cushioning gel layer may be located below the rider's ischial pelvic or sitting bones and genital areas. The cushioning gel layer may have sufficient thickness to provide adequate deformation to relieve excessive pressure on the pelvic bones so as to provide a comfortable ride. Furthermore, a layer of relatively firm plastic foam may be provided between the frame 14 and the cover 18 to provide additional resilient support for the rider and for constraining the cushioning gel layer.

Although the layers of cushion have been described above as being positioned between the frame 14 and the cover 14, the layers of cushion may be positioned in any other location. For example, one or more layers of cushion may be integrated into the cover 18 and/or the frame 14.

The layers of cushion may cover all or a portion of the top portion 34 of the frame 14. Additionally, the layers of cushion may further cover all or a portion of the side portions 38 of the frame 14. As such, the layers of cushion may provide cushioning for the rider's buttocks and legs while riding the bicycle.

The bicycle seat 10 may provide anatomic features which fully support the sacrum, coccyx, and complete ischium of a rider. As is discussed above, the bicycle seat 10 may include a combination of features that may provide full anatomical support and accommodation for areas of the pelvis including the surrounding tissues and musculature. The bicycle seat 10 may be exceptionally comfortable to use even for long periods of riding. It may be light in weight, small, attractive in appearance, and streamlined. The weight of the bicycle seat 10 may be approximately 200-350 grams, and its height may be approximately 45 mm (with the attachment rails 70).

As is also discussed above, the bicycle seat 10 may include an extended drooped nose (on each elongated protrusion 44), a wide medial section 26, a central channel 54, and a longitudinally extending gap 50, to provide greater and more even weight support to the rider. Thus, pressure upon the perineum/genital region may be greatly diminished and sometimes eliminated, while the pudendal artery and the pudendal nerve will be free of compression (or have reduced compression). For example, by extending the elongated protrusions 44 further forward and providing, a downward slope to the nose areas (drooped nose) of the elongated protrusions 44, the pubic rami of the rider may be supported comfortably by the elongated protrusions 44 while the pudendal nerve and the pudendal artery of the rider remains free of compression (or have reduced compression). As another example, by having an increased width near the medial section 26, the vertical angle of the outside edges (or side portions 38) of the bicycle seat 10 may be reduced. This may allow for reduced or softer contact with the adductor muscles in the legs and the hamstring muscles in the buttocks of the rider. This gentle side slope may further provide for more surface area to come into contact with the pubic rami and the superficial perineal space of the rider. Furthermore, it may absorb the contact pressure evenly over a larger area, reducing the isolated pressure point on the body. Therefore, the pudendal artery and pudendal nerve of the rider may continue to be free of compression (or have reduced compression). As a result the bicycle seat 10 may be exceptionally comfortable for long periods of riding.

The bicycle seat 10 may further include vents 74 (e.g., vent 74a and vent 74b) positioned in the rear end section 30 of the frame 14, and vent frames 78 (e.g., vent frame 78a and vent frame 78b) coupled in the vents 74. A vent 74 may be a hole (or opening or gap or cut out) that extends (or that includes a portion that extends) entirely through a portion of the frame 14 and into the bottom portion 42 of the frame 14, such as entirely through a side portion 38 of the frame 14 and into the bottom portion 42 of the frame 14. The vent 74 (in combination with the vent frame 78 coupled in the vent 74, in some examples) may create (or otherwise define) a passageway 80 through the side portion 38 so as to allow air to flow out of (or into) the bottom portion 42 of the frame 14.

Figure 8:
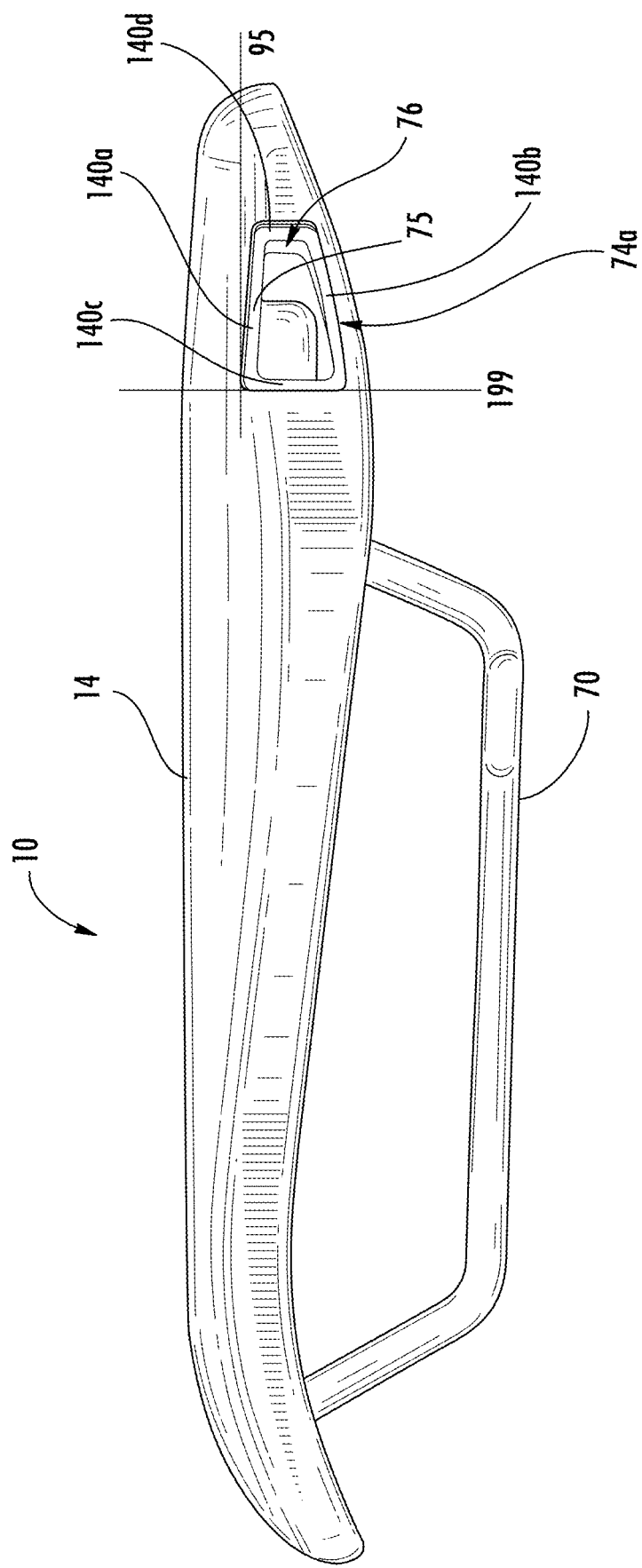
FIG. 8 is a side view of the bicycle seat of FIG. 1 without vent frames.

The vent 74 may have any shape. For example, the vent 74 may be shaped as a circle, an oval, a triangle, a square, a rectangle, a rhombus, a parallelogram, a trapezoid, a polygon, any other shape, or any combination of the preceding. Additionally, the sides, edges, and/or corners of the shape of the vent 74 may be straight or curved. As is illustrated in FIG. 8, the vent 74 is shaped as a trapezoid having curved corners. The vent 74 may further have any size.

The shape and/or size of the vent 74 may correspond to the shape and/or size of the vent frame 78. For example, as is illustrated in FIG. 8, the vent 74 may include an outer section 75 that is dimensioned to fit the outer surface 84 (discussed below) of the vent frame 78. In such an example, the outer section 75 of the vent 74 may have a shape that is the same as the shape of the outer surface of the vent frame 78, and may further have a length and width that is the same (or slightly bigger) then the length and width of the outer surface 84 of the vent frame 78. Additionally, the outer section 75 may have a depth that is the same (or slightly bigger) then the depth 104 (discussed below) of the outer surface 84 of the vent frame 78. This depth of the outer section 75 may cause the outer surface 84 of the vent frame 78 to be flush (or substantially flush, such as flush +/−1 mm) with the side portion 38 of the frame 14, which may further increase aerodynamics of the bicycle seat 10.

The vent 74 may further include an inner section 76 dimensioned to fit the lip portion 88 (discussed below) of the vent frame 78. In such an example, the inner section 76 may have a shape that is the same as the shape of the lip portion 88 of the vent frame 78, and length and width that is the same (or slightly bigger) than the length and height of the lip portion 88 of the vent frame 78.

The vent 74 may be positioned in any location in the rear end section 30 of the frame 14. For example, as is illustrated, the vent 74a may be positioned in side portion 38a of the rear end section 30 of the frame 14, and the vent 74b may be positioned in side portion 38b of the rear end section 30 of the frame 14. The vent 74 may be positioned at any location along the length of the rear end section 30. For example, the furthest forward point of the vent 74 (shown at station 199 in FIG. 8) may be positioned at a location that is at ½ of the length of the rear end section 30 (from the start of the rear end section 30 at station 151), ⅓ of the length of the rear end section 30, ¼ of the length of the rear end section 30, ⅔ of the length of the rear end section 30, ¾ of the length of the rear end section 30, or a location that is at any other portion of the length of the rear end section 30. As another example, the furthest forward point of the vent 74 may be positioned at a location that is within a range of ¼-⅔ of the length of the rear end section 30 (from the start of the rear end section 30 at station 151).

In some examples, the vent 74 may be positioned at any location along the overall length 32 of the frame 14. For example, the furthest forward point of the vent 74 (shown at station 199 in FIG. 8) may be positioned at a location that is at 6/10 of the overall length 32 of the frame 14 (from the start of the frame 14 at station 0), 7/10 of the overall length 32 of the frame 14, 8/10 of the overall length 32 of the frame 14, 8.5/10 of the overall length 32 of the frame 14, 9/10 of the overall length 32 of the frame 14, or a location that is at any other portion of the overall length 32 of the frame 14. As another example, the furthest forward point of the vent 74 may be positioned at a location that is within a range of 7/10-9/10 of the overall length 32 of the frame 14, or 8/10-9/10 of the overall length 32 of the frame 14 (from the start of the frame 14 at station 0). In some examples, the furthest forward point of the vent 74 (shown at station 199 in FIG. 8) may be positioned approximately 180-220 mm (and in some examples, more preferably 199 mm) from the start of the frame 14 at station 0.

The vent 74 may further be positioned at any location along the height of the frame 14. For example, the top point of the vent 74 (shown at position 95 in FIG. 8) may be positioned at a location that is at ½ of the top height 94 (illustrated in FIG. 2) of the frame 14 (from the top most point of the top height 94), 4.5/10 of the top height 94 of the frame 14, 2/5 of the top height 94 of the frame 14, 1/3 of the top height 94 of the frame 14, ¼ of the top height 94 of the frame 14, 2/3 of the top height 94 of the frame 14, ¾ of the top height 94 of the frame 14, or a location that is at any other portion of the top height 94 of the frame 14. As another example, the top point of the vent 74 may be positioned at a location that is within a range of ¼-2/3 or 2/5-½ of the top height 94 of the frame 14. In some examples, the top point of the vent 74 (shown at position 95 in FIG. 8) may be positioned approximately 10-18 mm (and in some examples, more preferably 14 mm) from the top most point of the top height 94.

The bicycle seat 10 may have any number of vents 74. As is illustrated, the bicycle seat 10 has two vents 74: vent 74a and vent 74b. The vents 74 may be positioned at any location with regard to each other. For example, vent 74a may be positioned longitudinally in line with vent 74b. In such an example, the center point of vent 74a may be positioned at the same location on the side portion 38a of the rear end section 30 as the center point of vent 74b is positioned on the side portion 38b of the rear end section 30. In further examples, vents 74a and 74b may be positioned in locations that are offset from each other.

The vents 74 may have the same (or substantially the same, such as the same within a manufacturing tolerance) shape and/or size. Alternatively, one or more of the vents 74 may have a different shape and/or size than the other vent(s) 74.

Although the vents 74 have been described as being positioned in the rear end section 30 of the frame 14, the vents 74 may have a size and/or a positioning that causes the vents 74 to be positioned in any other location on the frame 14. For example, the vents 74 may have a size and/or a positioning that causes the vents 74 to be positioned partially in the rear end section 30 and partially in the medial section 26.

The bicycle seat 10 may further have vent frames 78 coupled in the vents 74. For example, as is illustrated in FIGS. 1-7, the bicycle seat 10 may have a first vent frame 78a coupled in vent 74a and a second vent frame 78b coupled in vent 74b.

The vent frame 78 may be any device that may be positioned in a vent 74 (or otherwise coupled in the vent 74), and that may further help create (or otherwise define) a passageway 80 that allows air to pass through both the vent 74 and the vent frame 78 to vent outside of the frame 14. Air that travels underneath the frame 14 may be able to exit the frame 14 through passageways 80, which may enhance the aerodynamics of the bicycle seat 10. Additionally, in some examples, the vent frame 78 may further be any device that may couple (or assist in coupling) cover 18 to the frame 14. For example, a portion of the cover 18 may extend into (or through) the vents 74. In such an example, when the vent frame 78 is coupled in the vent 74, the vent frame 78 may further couple the cover 18 to the frame 14. This coupling may further secure the cover 18 to the frame 14, which may prevent the cover 18 from moving (or reduce the amount of movement) when the cover 18 is installed on the frame 14.

Figure 10:
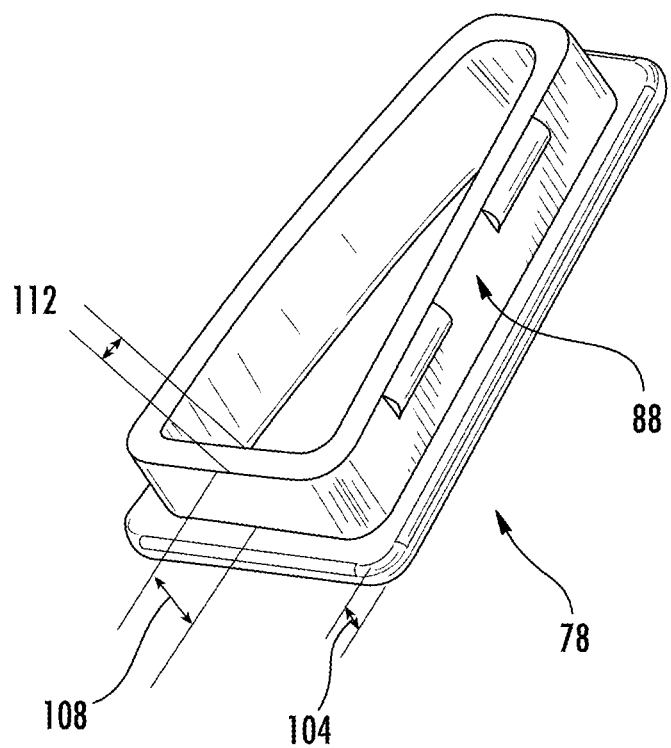
FIG. 10 is a perspective back view of the vent frame of FIG. 9.
Figure 11:
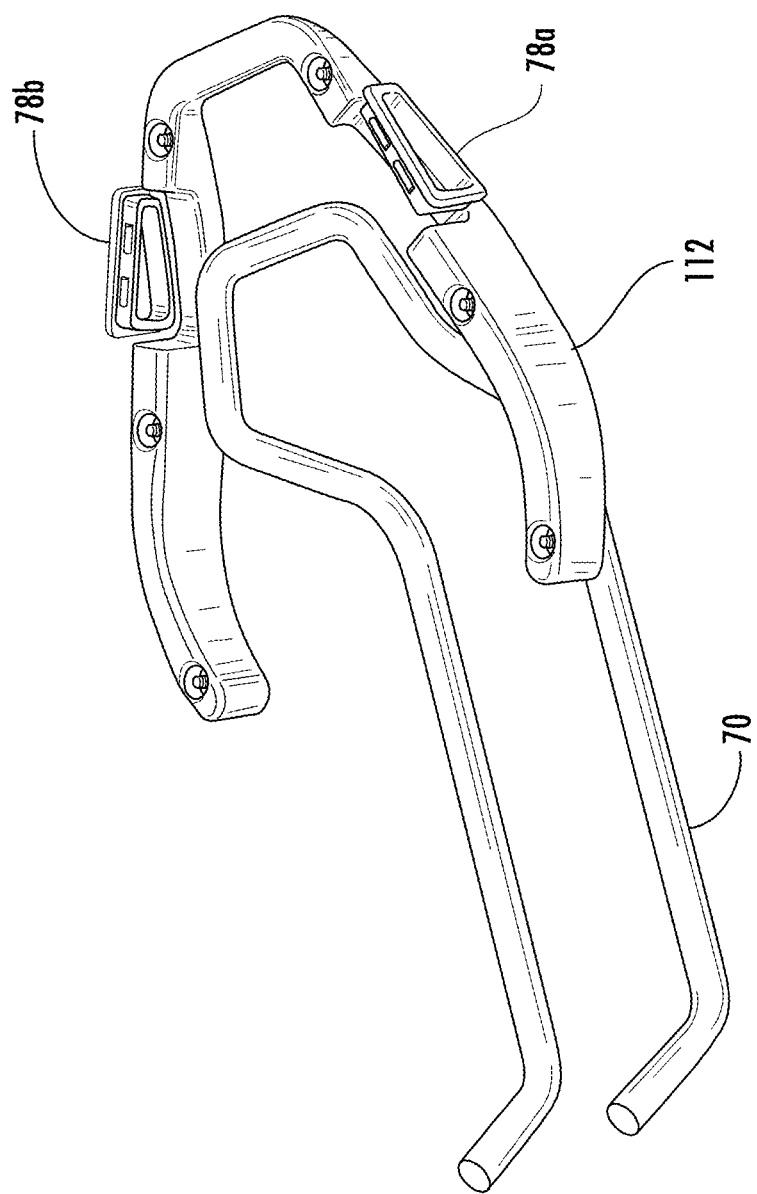
FIG. 11 is a perspective view of the bicycle seat of FIG. 1 without a frame.

The vent frame 78 may be coupled in the vent 74 in any manner. For example, the vent frame 78 may be sized to be squeezed into the vents 74. This sizing of the vent frame 78 may create a pressure-based and/or friction-based coupling of the vent frame 78 in the vent 74. In such an example, the vent frame 78 may include bumps on a lip portion 88 of the vent frame 78 (as is illustrated in FIG. 10), so as to increase the pressure and or friction used to couple the vent frame 78 in the vent 74. The lip portion 88 may further include edges that extend horizontally outward from the lip portion 88. When the lip portion 88 is pushed into the hole 74, the edges of the lip portion 88 may create a ledge that is greater than the size of the vent 74. This edge may grip the back side of the side portion 38, which may prevent the vent frame 78 from easily being removed from the vent 74. As another example, the vent frame 78 may be coupled in the vent 74 using an adhesive. As a further example, the vent frame 78 may be coupled in the vent 74 using one or more connectors (such as nails and/or screws). Also, the vent frame 78 may be coupled in the vent 74 in any other manner, or any combination of the preceding.

The vent frame 78 may be made of (or otherwise constructed of) any material. For example, the vent frame 78 may be a one-piece plastic vent frame that is made of an injection molded polypropylene, polyurethane, polymer, ABS copolymer, nylon, molded plastic, carbon fiber, any other like material, any other plastic or polymer material, or any combination of the preceding. The vent frame 78 may be rigid, semi-rigid, or pliable.

The vent frame 78 may have any shape. For example, the vent frame 78 may be shaped as a circle, an oval, a triangle, a square, a rectangle, a rhombus, a parallelogram, a trapezoid, a polygon, any other shape, or any combination of the preceding. Additionally, the sides, edges, and/or corners of the shape of the vent frame 78 may be straight or curved. As is illustrated, the vent frame 78 is shaped as a trapezoid having curved corners. The vent 74 may further have any size.

In some examples, the vent frame 78 may have a shape and/or size that corresponds with the shape and/or size of the vent 74. For example, when the vent 74 is shaped as a polygon (such as a trapezoid) with curved corners, the vent frame 78 may be shaped as a polygon with curved corners, and may have a size that is slightly smaller than the size of the vents 74 (so as to fit within the vent 74). In other examples, the vent frame 78 may have a different shape and/or size than the shape and/or size of the vent 74. For example, when the vent 74 is shaped as a circle, the vent frame 78 may have a first portion (such as a lip portion 88, illustrated in FIG. 10) that is shaped as a circle, but may have a second portion (such as outer surface 84 illustrated in FIG. 9) that is shaped as any other shape, such as a square, a triangle, a polygon, or any other shape.

Figure 9:
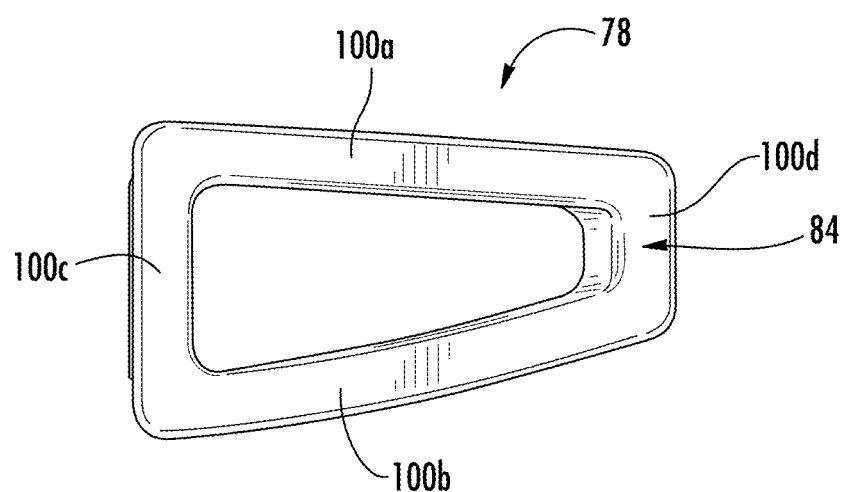
FIG. 9 is a side view of one example of vent frames for a bicycle seat.

As is illustrated in FIGS. 9-10, the vent frame 78 may include an outer surface 84 and a lip portion 88. The outer surface 84 may be an exterior portion of the vent frame 78, and the lip portion 88 may be an interior portion of the vent frame 78 that extends further into (or through) the vent 74.

The outer surface 84 may have any shape and/or size. The shape, length, and or width of the outer surface may be defined by the dimensions and angles of edge portions 100 that make up the outer surface 84 (discussed below). The outer surface 80 may further have a depth 104 of any size.

The outer surface 84 may be made up of one or more edge portions 100 that may be visible to a user when the vent frame 78 is coupled in the vent 74. The outer surface 84 may have any number of edge portions 100. For example, when the outer surface 84 is shaped as a circle, the outer surface 84 may only have a single edge portion 100. As another example, when the outer surface 84 is shaped as a polygon, the outer surface 84 may have three or more edge portions 100. As illustrated in FIGS. 9-10, the outer surface 84 has four edge portions 100: a top edge portion 100a, a bottom edge portion 100b, a first side edge portion 100c, and a second side edge portion 100d. The edge portions 100 may be formed integrally with each so as to create a single piece.

The edge portions 100 may have any size in relation to each other. For example, as is illustrated, the bottom edge portion 100b may have a length that is greater than the length of the top edge portion 100a. Also, the length of the top edge portion 100b may be greater than the length of the first side edge portion 100c, and the length of the first side edge portion 100c may be greater than the length of the second side edge portion 100d. In some examples, the length of the second side edge portion 100d may be ⅔ of the length of the first side edge portion 100c, ½ of the length of the first side edge portion 100c, ⅖ of the length of the first side edge portion 100c, ⅓ of the length of the first side edge portion 100c, ¼ of the length of the first side edge portion 100c, or any other size in comparison to the length of the first side edge portion 100c.

Although the edge portions 100 have been illustrated as having particular lengths (and/or other dimensions), the length (and/or other dimensions) of the edge portions 100 may vary. For example the length of all of the edge portions 100 may be equal or substantially equal (e.g., equal +/−1 mm). As another example, the length of the top edge portion 100a may be greater than the length of the bottom edge portion 100b, and the length of the second side edge portion 100d may be greater than the length of the first side edge portion 100c.

The edge portions 100 may further be positioned at any angle with respect to each other. For example, the top edge portion 100a may be positioned at a parallel angle (or a substantially parallel angle, such as a parallel angle +/−5°) to the bottom edge portion 100b. Alternatively, the top edge portion 100a may be positioned at a non-parallel angle to the bottom edge portion 100b. As another example, the first side edge portion 100c may be positioned at a parallel angle (or a substantially parallel angle, such as a parallel angle +/−5°) to the second side edge portion 100d. Alternatively, the second side edge portion 100c may be positioned at a non-parallel angle to the second side edge portion 100d.

The top edge portion 100a (and/or the bottom edge portion 100b) may be positioned at any angle with respect to the first side edge portion 100c and/or the second side edge portion 100d. For example, the top edge portion 100a (and/or the bottom edge portion 100b) may be positioned at an orthogonal angle with respect to the first side edge portion 100c and/or the second side edge portion 100d, an acute angle with respect to the first side edge portion 100c and/or the second side edge portion 100d, or an obtuse angle with respect to the first side edge portion 100c and/or the second side edge portion 100d.

As is discussed above, the vent frame 78 may further include a lip portion 88. The lip portion 88 may extend from the outer surface 84 into the vent 74. The lip portion 88 may be formed integral with the outer surface 84 so as to create a single piece.

The lip portion 88 may have any size and/or shape. The shape of the lip portion 88 may correspond to the shape of the outer surface 84. For example, when the outer surface 84 is shaped as a polygon with curved corners, the lip portion 88 may also be shaped as a polygon with curved corners. Alternatively, the shape of the lip portion 88 may be different from the shape of the outer surface 84.

The lip portion 88 may have a depth 108 that allows the lip portion 88 to extend into the vent 74. The depth 108 may be any size. The size of the depth 108 of the lip portion 88 may cause the lip portion 88 to extend into the vent 74 by any amount. For example, the size of the depth 108 of the lip portion 88 may cause the lip portion 88 extend ⅔ of the way through the depth of the vent 74, ½ of the way through the depth of the vent 74, ⅖ of the way through the depth of the vent 74, ⅓ of the way through the depth of the vent 74, ¼ of the way through the depth of the vent 74, or any other amount through the depth of the vent 74. As another example, the depth 108 of the lip portion 88 may cause the lip portion 88 to extend all the way through the depth of the vent 74. In such an example, the back surface of the lip portion 88 may be flush with the back surface of the lip 58 of the frame 14. As a further example, the depth 108 of the lip portion 88 may cause the lip portion 88 to extend to within a range of ½—all the way through the depth of the vent 74. The lip portion 88 may further have a width 112. The width 112 may be any size.

The vent frame 78 and the vent 74 (or the vent 74, by itself) may create (or otherwise define) a passageway 80 that may allow air to flow out of (or into) the bottom portion 42 of the frame 14. The passageway 80 may have any size and/or shape. In some examples, the size and/or shape of the passageway 80 may be defined by the size and/or shape of the vent frame 78. For example, the size and/or shape of the passageway 80 may be defined by the width 112 of the lip portion 88 and/or the interior shape of the lip portion 88. In some examples, the size and/or shape of the passageway 80 may be defined by the size and/or shape of the vent 74, or the size and/or shape of a portion of the vent 74.

The passageway 80 may have a top height 92 (illustrated in FIG. 2). The size of the top height 92 may correspond to the top height 94 of the frame 14. For example, the size of the top height 92 of the passageway 80 may be ⅔ of the size of the top height 94 of the frame 14, ½ of the size of the top height 94 of the frame 14, ⅖ of the size of the top height 94 of the frame 14, ⅓ of the size of the top height 94 of the frame 14, ¼ of the size of the top height 94 of the frame 14, ⅕ of the size of the top height 94 of the frame 14, or any other size in relation to the size of the top height 94 of the frame 14. As another example, the size of the top height 92 of the passageway 80 may be within a range of ⅕-½ or ¼-⅖ of the size of the top height 94 of the frame 14. In some examples, the size of the top height 92 of the passageway 80 may be approximately 7-13 mm, and in some examples, more preferably 10.74 mm (or 11 mm).

The passageway 80 may also have a top length 96 (illustrated in FIG. 2). The size of the top length 96 may correspond to the overall length 32 of the frame 14. For example, the size of the top length 96 may be ⅙ of the size of the overall length 32 of the frame 14, 1/7 of the size of the overall length 32 of the frame 14, 1/8 of the size of the overall length 32 of the frame 14, 1/9 of the size of the overall length 32 of the frame 14, 1/10 of the size of the overall length 32 of the frame 14, 1/11 of the size of the overall length 32 of the frame 14, or any other size in relation to the size of the overall length 32 of the frame 14. As another example, the size of the top length 96 of the passageway 80 may be within a range of 1/12-1/7 or 1/10-1/7 of the size of the overall length 32 of the frame 14. In some examples, the size of the top length 96 of the passageway 80 may be approximately 25-33 mm, and in some examples, more preferably 31.95 mm (or 32 mm).

To allow air to enter and/or exit the bottom portion 42 of the frame 14, the passageway may extend all the way through a side portion 38 of the frame 14. The passageway 80 may extend through the side portion 38 of the frame 14 in any direction. For example, as is illustrated in FIG. 6, the passageway 80 may extend through a side portion 38 of the rear end section 30 in a direction 81 that is orthogonal (or substantially orthogonal, such as orthogonal +/−) 10° to the side portion 38. In such an example, the direction 80 may have an angle 82 that is 90° (or 90°+/−10°) to the side portion 38. In other examples, the angle 82 may be within a range of 70-120° to the side portion 38, or any other angle to the side portion 38. The angle 82 of the direction 81 may be based on (or otherwise be created by) the angle at which the vent 74 extends through the side portion 38 of the frame 14 and/or the angle(s) of the interior of the lip portion 88 of the vent frame 78.

Although bicycle seat 10 has been described above as including two vents 74 and two vent frames 78, the bicycle seat 10 may include any other number of vents 74 and vent frames 78. For example, the bicycle seat 10 may include four vents 74 and four vent frames 78, six vents 74 and six vent frames 78, eight vents 74 and eight vent frames 78, or any other number of vents 74 and any other number of vent frames 78. Furthermore the bicycle seat 10 may have an odd number of vents 74 and vent frames 78, or the bicycle seat 10 may have a different number of vents 74 than vent frames 78 (such as three vents 74 and two vent frames 78).

The bicycle seat 10 may further include a bracket 112 coupled to the frame 14, such as coupled to the bottom portion 42 of the frame 14 (as is illustrated in FIG. 7). The bracket 112 may couple (or assist in coupling) the cover 18 to the frame 14. This coupling by the bracket 112 may eliminate the need to use staples (or other connectors) to attach the cover 18 to the frame 14. Instead, the bracket 112 may be able to attach the cover 18 to the frame 14. Alternatively, even if one or more staples (or other connectors) are used to attach the cover 18 to the frame 14, the bracket 112 may be positioned over the staples, which may improve the aesthetics of the bicycle seat 10 by hiding such staples from view.

The bracket 112 may be coupled to the frame 14 in any manner. For example, the bracket 112 may be coupled to the frame 14 using one or more connectors (such as screws, nails, etc.), an adhesive, any other manner of coupling the bracket 112 to the frame 14, or any combination of the preceding.

The bracket 112 may be made of (or otherwise constructed of) any material. For example, the bracket 112 may be a one-piece plastic bracket that is made of an injection molded polypropylene, polyurethane, polymer, ABS copolymer, nylon, molded plastic, carbon fiber, any other like material, any other plastic or polymer material, or any combination of the preceding. The bracket 112 may be rigid, semi-rigid, or pliable.

The bracket 112 may have any shape. For example, the bracket 112 may be shaped to extend along the bottom lip 58 of the bottom portion 42 of the frame 14. In such an example, the shape of the bracket 112 may correspond to the shape of the bottom portion 42 of the frame 14, and more particularly, may correspond to the shape of the lip portion 58 of the bottom portion 42 of the frame 14.

The bracket 112 may also have any size. The bracket 112 may have a total length 114 (illustrated in FIG. 7). The total length 114 may be any size. In some examples, the total length 114 may correspond to the overall length 32 of the frame 14. For example, the size of the total length 114 of the bracket 112 may be 2/3 of the overall length 32 of the frame 14, 1/2 of the overall length 32 of the frame 14, 2/5 of the overall length 32 of the frame 14, 1/3 of the overall length 32 of the frame 14, 1/4 of the overall length 32 of the frame 14, or any other size that corresponds to the overall length 32 of the frame 14. As another example, the size of the total length 114 of the bracket 112 may be within a range of 1/3-2/3 of the overall length 32 of the frame 14.

Figure 12:
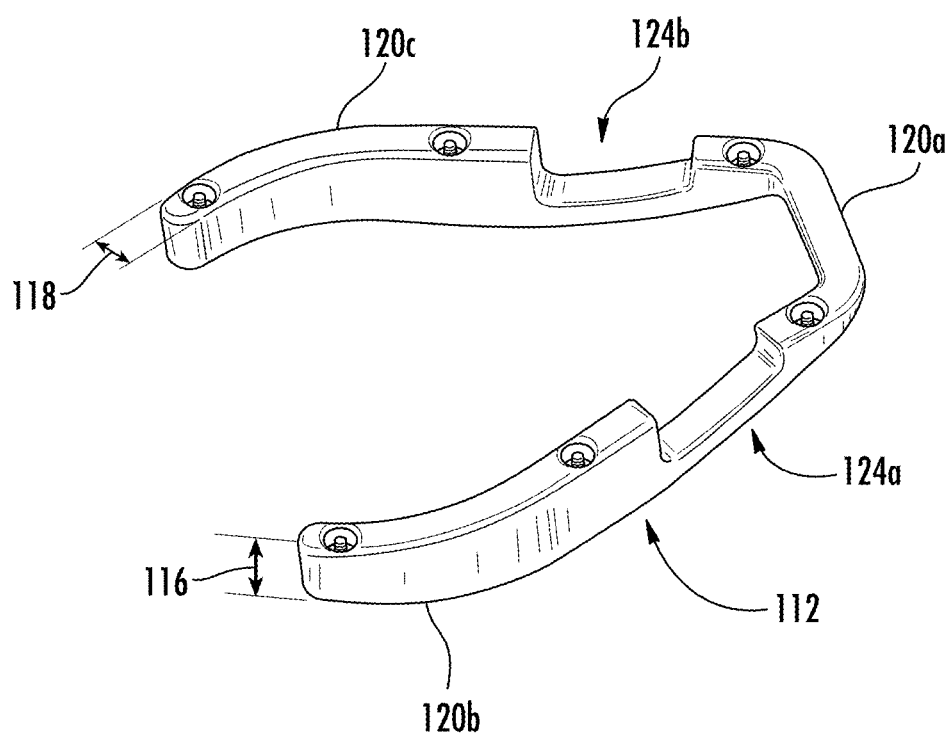
FIG. 12 is a perspective view of one example of a bracket for a bicycle seat.

The bracket 112 may have a height 116 (illustrated in FIG. 12). The height 116 may be any size. In some examples, the height 116 of the bracket 112 may be equal (or substantially equal, such as equal +/−2 mm) to the height of the lip portion 58 of the frame 14. In such examples, when the bracket 112 is coupled to the frame 14, the bracket 112 may be flush (or substantially flush, such as flush +/−1 mm) with the top of the lip portion 58 of the frame 14. This may improve aerodynamics, in some examples. Furthermore, the height 116 of the bracket 112 may vary along the length of the bracket 112 so as to remain flush (or substantially flush) with the top of the lip portion 58 of the frame 14

The bracket 112 may have a width 118 (illustrated in FIG. 12). The width 118 may be any size that may allow the bracket 112 to be coupled to the frame 14. In some example, the width 118 may be of a size that allows the bracket 112 to be coupled to the frame 14 without interfering with one or more additional elements of the frame 14. For example, the width 118 of the bracket 112 may be sized so that when the bracket 112 is coupled to the bottom portion 42 of the frame 14, the bracket 112 does not touch (or otherwise interfere with) the connection pieces 66 of the frame 14.

The bracket 112 may include one or more bracket portions 120. The bracket 112 may include any number of bracket portions 120. For example, as is illustrated in FIGS. 7 and 12, the bracket 112 may include three bracket portions 120: a base bracket portion 120a, a first side bracket portion 120b, and a second side bracket portion 120c The bracket portions 120 may be formed integral the each other so as to create a single piece.

The bracket portions 120 may have any shape. For example, a bracket portion 120 may be straight, jagged, curved, any other shape, or any combination of the preceding. As is illustrated, the base bracket portion 120a is substantially straight, and the first side bracket portion 120b and the second side bracket portion 120c are partially substantially straight and partially curved (e.g., they have curved ends). The shape of each bracket portion 120 may correspond to the shape of the lip portion 58. For example, a bracket portion 120 may have the same type of shape as the lip portion 58 along which the bracket portion 120 may extend. For example, when the lip portion 58 is curved, the bracket portion 120 that extends across the curving lip portion 58 may have the same (or substantially the same) curve as the lip portion 58.

The bracket portions 120 may have any size in relation to each other. For example, as is illustrated, the first side bracket portion 120b may have the same length as the length of the second side bracket portion 120c. Also, the length of the first side bracket portion 120b and the length of second side bracket portion 120c may each be greater than the length of the base bracket portion 120a.

The bracket portions 120 may be positioned at any angle in relation to each other. For example, as is illustrated, the first side bracket portion 120b and the second side bracket portion 120c may be positioned at obtuse angles to the base bracket portion 120a. In some examples, the obtuse angle may be within a range of 110-140°.

The bracket 112 may include indentations 124 (e.g., indentations 124a and 124b), as is illustrated in FIG. 12. Indentations 124 may be openings (or gaps) in the height 116 of the bracket 112 that may prevent the bracket 112 from blocking all or a portion of vents 74 and/or passageways 80. Indentations 124 may allow air to flow past bracket 112 and through passageways 80 out of the frame 14 (or vice versa). Indentations 124 may be any size and/or shape that may prevent the bracket 112 from blocking all or a portion of vents 74 and/or passageways 80. Example shapes of the indentations 124 may include a rectangle, a circle, a square, a triangle, an oval, any other shape that may prevent the bracket 112 from blocking all or a portion of vents 74 and/or passageways 80, or any combination of the preceding. Furthermore, the sides, edges, and/or corners of the shape of the indentations 124 may be straight or curved.

Modifications, additions, combinations, or omissions may be made to the bicycle seat 10 (or any of the components of the bicycle seat 10) without departing from the scope of the disclosure. For example, although the bicycle seat 10 has been described above as including (1) the vents 74, (2) the vent frames 78, and (3) a bracket 112, in some examples, the bicycle seat 10 may not include one or more of these components. For example, the bicycle seat 10 may only include the vents 74, only include the vents 74 and the vent frames 78, only include the bracket 112, or only include the vents 74 and the bracket 112.

Furthermore, the outer section 75 of the vent 74 may include vent edges 140, as is illustrated in FIG. 8. For example, the outer section 75 of the vent 74 may include four vent edges 140: a top vent edge 140a, a bottom vent edge 140b, a first side vent edge 140c, and a second side vent edge 140d. The dimensions and angles of these vent edges 140 may define the shape, length, and/or height of the vent 74. The vent edges 140 may have the same (or substantially the same) dimensions (e.g., length) and angles as the dimensions and angles discussed above with regard to edge portions 100.

Figure 13:
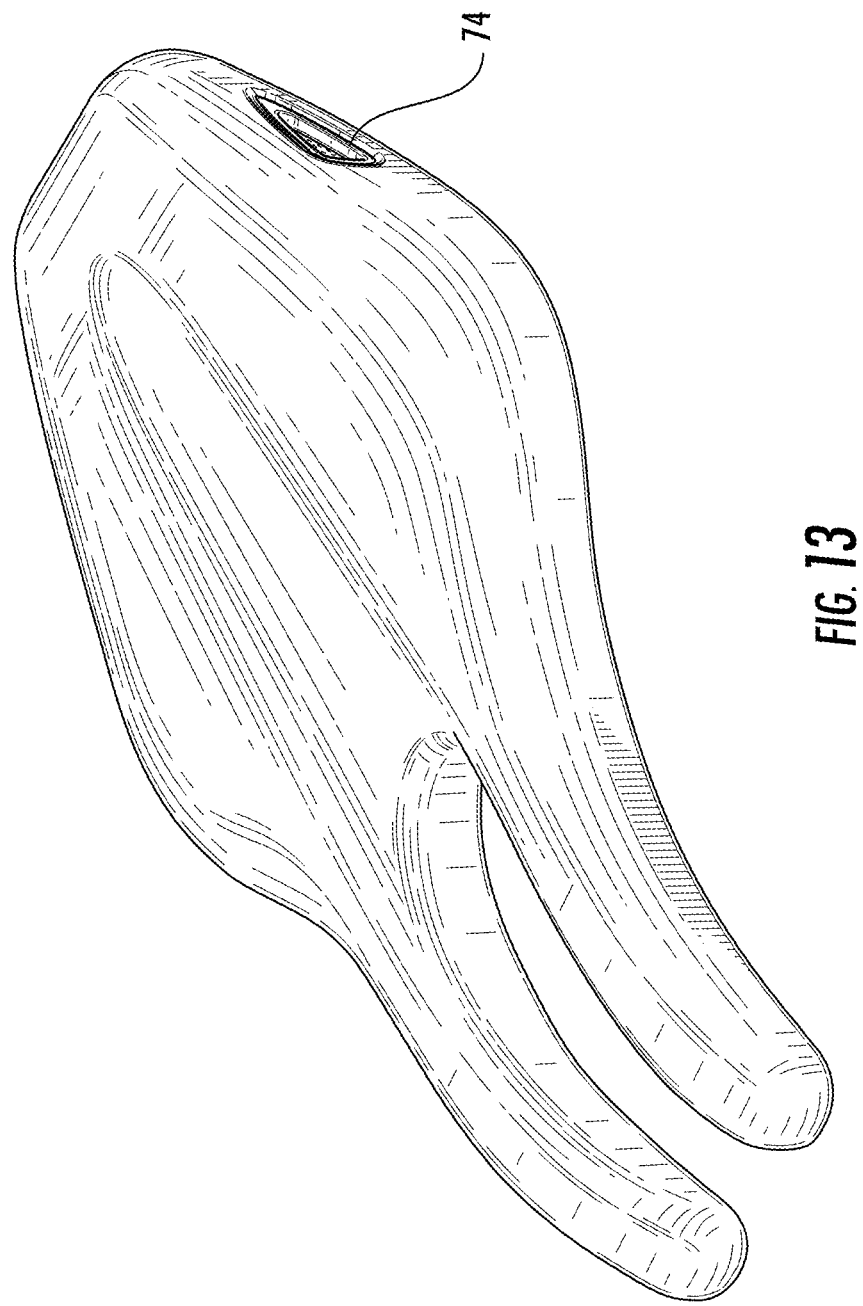
Figure 16:
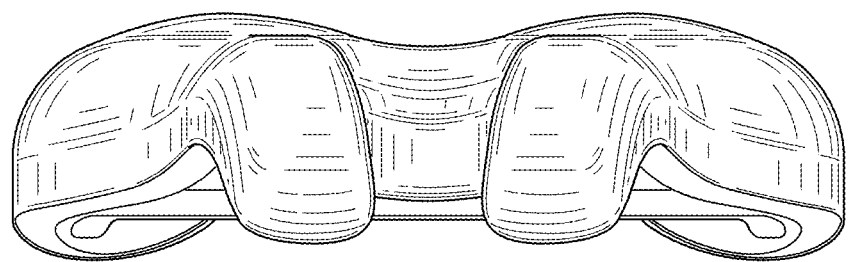
Figure 17:
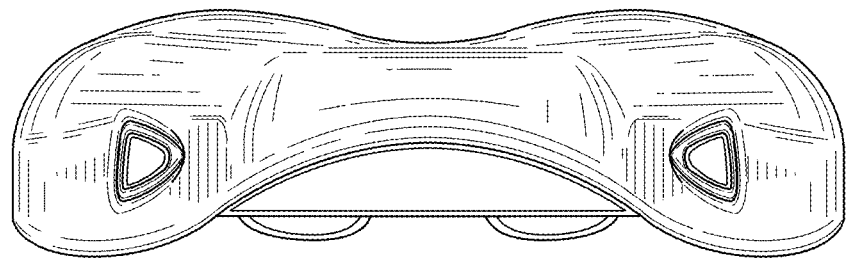
Figure 18:
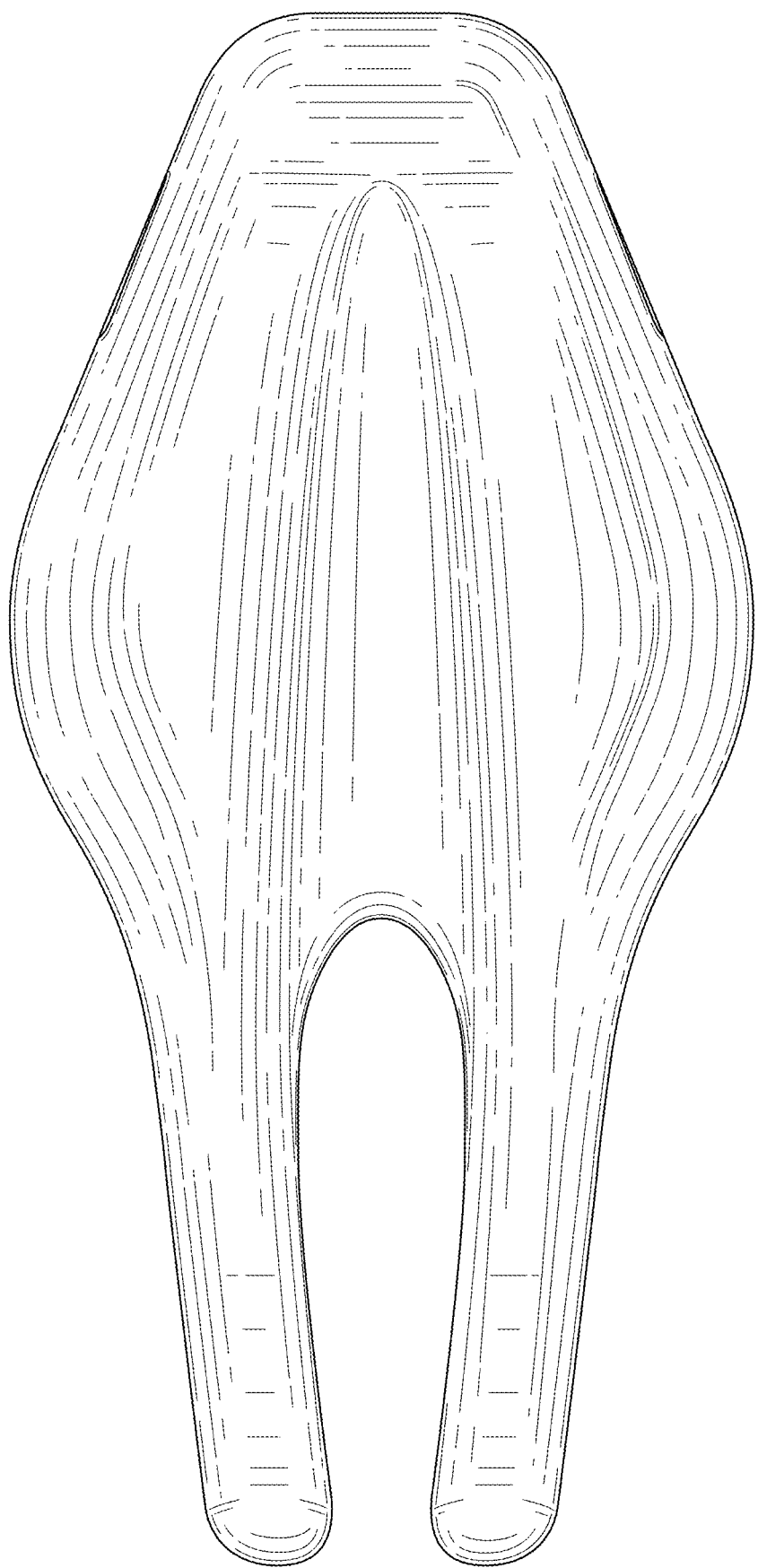

FIGS. 13-18 illustrate various views of another example of a bicycle seat. For example, FIG. 13 is a perspective view of another example of a bicycle seat; FIG. 14 is a side view of the bicycle seat of FIG. 13; FIG. 15 is an opposite side view of the bicycle seat of FIG. 13; FIG. 16 is a front view of the bicycle seat of FIG. 13; FIG. 17 is a rear view of the bicycle seat of FIG. 13; and FIG. 18 is a top view of the bicycle seat of FIG. 13.

As illustrated, the bicycle seat of FIGS. 13-18 includes vents 74, but does not include (or use) vent frames 78. As such, the vents 74 may create (or otherwise define) passageways 80 through the side portions 38 of the frame 14 so as to allow air to flow out of (or into) the bottom portion 42 of the frame 14. Air that travels underneath the frame 14 may be able to exit the frame 14 through passageways 80 created by the vents 74, which may enhance the aerodynamics of the bicycle seat 10. For example, the passageways 80 created by the vents 74 may provide for air to flow across the bottom of the frame 14 and then flow outside the frame 14 through the passageways 80. The vents 74 of FIGS. 13-18 (such as the dimensions, positioning, features, and characteristics of the vents 74 of FIGS. 13-18) may be substantially similar to the vents 74 of FIGS. 1-12. Furthermore, the passageways 80 of FIGS. 13-18 (such as the dimensions, positioning, features, and characteristics of the passageways 80 of FIGS. 13-18) may be substantially similar to the passageways 80 of FIGS. 1-12.

The vent 74 may have any shape and/or size. As illustrated, the vent 74 is shaped as a sideways teardrop. The shape, length, and/or height of the vent 74 may be defined by the dimensions and angles of vent edges 140 that make up the vent 74. The vent 74 may have any number of vent edges 140. For example, when the vent 74 is shaped as a circle, the vent 74 may only have a single vent edge 140. As another example, when the vent 74 is shaped as a polygon, the vent 74 may have three or more vent edges 140. As illustrated in FIG. 15, the vent 74 has three vent edges 140: a top vent edge 140a, a bottom vent edge 140b, and a side vent edge 140c.

The vent edges 140 may have any size in relation to each other. For example, as is illustrated, the bottom vent edge 140b may have a length that is greater than the length of the top vent edge 140a. Also, the length of the side vent edge 140c may be less than the length of the top vent edge 140a and the length of the bottom vent edge 140b. In some examples, the length of the side vent edge 140c may be ½ of the length of the bottom vent edge 140b, ⅓ of the length of the bottom vent edge 140b, ¼ of the length of the bottom vent edge 140b, or any other size in comparison to the length of the bottom vent edge 140b. Additionally, one or more (or all) of the vent edges 140 may be slanted from a horizontal axis or a vertical axis by 10-15 degrees, as is further illustrated.

The passageway 80 created by a vent 74 may have the same shape and/or size as the vent 74, or the passageway 80 may have a different shape and/or size. As illustrated, the passageway 80 created by the vent 74 of FIG. 14 has a different shape and size than the vent 74. For example, although the vent 74 is shaped as a sideways teardrop, the passageway 80 created by the vent 74 is shaped as an irregular triangle with curved vertices. Also, the passageway 80 has a diagonally measured length of approximately 30-36 mm (and in some examples, preferably 33 mm), a horizontally measured length of approximately 30-36 mm (and in some examples, preferably 33 mm), a maximum height of approximately 7-13 mm (and in some examples, preferably 11 mm), and a depth (through the side portions 38) of approximately 2-7 mm. Additionally, one or more of the sides of the irregular triangle may be slanted from a horizontal axis or a vertical axis by approximately 10-15 degrees, as is further illustrated.

The passageway 80 may have any size surface area. For example, the passageway 80 may have a surface area of approximately 220-280 mm squared, and in some examples, more preferably 253 mm squared. The surface area of the passageway 80 may have any size in comparison to the surface area of the vent 74. For example, the surface area of the passageway 80 may be 9/10 of the size of the surface area of the vent 74, ⅘ of the size of the surface area of the vent 74, ¾ of the size of the surface area of the vent 74, ⅔ of the size of the surface area of the vent 74, ½ of the size of the surface area of the vent 74, ⅓ of the size of the surface area of the vent 74, ¼ of the size of the surface area of the vent 74, or may be any other size in comparison to the surface area of the vent 74.

As is also illustrated, the bicycle seat of FIGS. 13-18 does not include attachment rail 70 (discussed above with regard to FIGS. 1-12). However, in various embodiments, the bicycle seat of FIGS. 13-18 may include attachment rail 70, any of the other components of FIGS. 1-12, and/or any of the features discussed above with regard to FIGS. 1-12.

FIGS. 19-20 are side views of another example of a bicycle seat. As illustrated, the bicycle seat of FIGS. 19-20 includes vents 74, but does not include (or use) vent frames 78. As such, the vents 74 may create (or otherwise define) passageways 80 through the side portions 38 of the frame 14 so as to allow air to flow out of (or into) the bottom portion 42 of the frame 14. Air that travels underneath the frame 14 may be able to exit the frame 14 through passageways 80 created by the vents 74, which may enhance the aerodynamics of the bicycle seat 10. For example, the passageways 80 created by the vents 74 may provide for air to flow across the bottom of the frame 14 and then flow outside the frame 14 through the passageways 80. The vents 74 of FIGS. 19-20 (such as the dimensions, positioning, features, and characteristics of the vents 74 of FIGS. 19-20) may be substantially similar to the vents 74 of FIGS. 1-12 and/or FIGS. 13-18. The passageways 80 of FIGS. 19-20 (such as the dimensions, positioning, features, and characteristics of the passageways 80 of FIGS. 19-20) may be substantially similar to the passageways 80 of FIGS. 1-12 and/or FIGS. 13-18.

The vent 74 may have any shape and/or size. As illustrated, the vent 74 is shaped as an irregular triangle with curved vertices. The shape, length, and/or height of the vent 74 may be defined by the dimensions and angles of vent edges 140 that make up the vent 74. The vent 74 may have any number of vent edges 140. For example, when the vent 74 is shaped as a circle, the vent 74 may only have a single vent edge 140. As another example, when the vent 74 is shaped as a polygon, the vent 74 may have three or more vent edges 140. As illustrated in FIG. 19, the vent 74 has three vent edges 140: a top vent edge 140a, a bottom vent edge 140b, and a side vent edge 140c.

The vent edges 140 may have any size in relation to each other. For example, as is illustrated, the bottom vent edge 140b may have a length that is greater than the length of the top vent edge 140a. Also, the length of the side vent edge 140c may be less than the length of the top vent edge 140a and the length of the bottom vent edge 140b. In some examples, the length of the side vent edge 140c may be ½ of the length of the bottom vent edge 140b, ⅓ of the length of the bottom vent edge 140b, ¼ of the length of the bottom vent edge 140b, or any other size in comparison to the length of the bottom vent edge 140b. Additionally, one or more (or all) of the vent edges 140 may be slanted from a horizontal axis or a vertical axis by 10-15 degrees, as is further illustrated.

The passageway 80 created by a vent 74 may have the same shape and/or size as the vent 74, or the passageway 80 may have a different shape and/or size. As illustrated, the passageway 80 created by the vent 74 of FIGS. 19-20 has a different shape and size than the vent 74. For example, although the vent 74 is shaped as an irregular triangle with curved vertices, the passageway 80 created by the vent 74 is shaped as a polygon having curved sides and curved vertices. Also, in some examples, the passageway 80 has a diagonally measured length of approximately 30-36 mm (and in some examples, preferably 33 mm), a horizontally measured length of approximately 30-36 mm (and in some examples, preferably 33 mm), a first side having a height of approximately 7-13 mm (and in some examples, preferably 10 mm), a second side having a height of approximately 2-8 mm (and in some examples, preferably 5 mm), and a depth (through the side portions 38) of approximately 2-7 mm. Additionally, one or more of the sides of the polygon may be slanted from a horizontal axis or a vertical axis by approximately 10-15 degrees, as is further illustrated.

The passageway 80 may have any size surface area. For example, the passageway 80 may have a surface area of approximately 220-280 mm squared, and in some examples, more preferably 253 mm squared. The surface area of the passageway 80 may have any size in comparison to the surface area of the vent 74. For example, the surface area of the passageway 80 may be 9/10 of the size of the surface area of the vent 74, ⅘ of the size of the surface area of the vent 74, ¾ of the size of the surface area of the vent 74, ⅔ of the size of the surface area of the vent 74, ½ of the size of the surface area of the vent 74, ⅓ of the size of the surface area of the vent 74, ¼ of the size of the surface area of the vent 74, or may be any other size in comparison to the surface area of the vent 74. In some examples, the portion of the vent 74 that does not form the passageway 80 may be indented against the side portion 38 of the frame 14, as is illustrated.

Although the bicycle seat of FIGS. 19-20 has been described as having particular components and/or features, the bicycle seat of FIGS. 19-20 may have any of the other components and/or features discussed above with regard to FIGS. 1-18.

Figure 21:
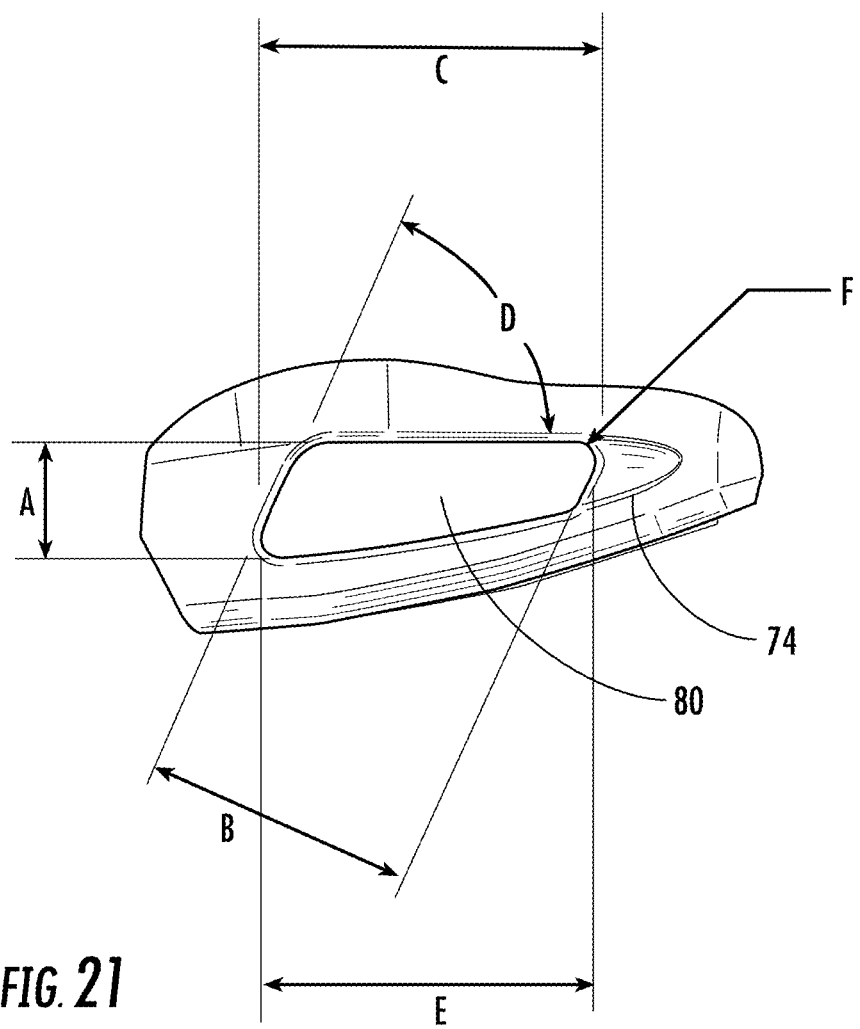
FIG. 21 is a side view of an example vent for the bicycle seats of FIGS. 1-20.

FIG. 21 is a side view of an example vent for the bicycle seats of FIGS. 1-20. As illustrated, the vents 74 of FIG. 21 do not include (or use) vent frames 78. As such, the vents 74 may create (or otherwise define) passageways 80 through the side portions 38 of the frame 14 of bicycle seats 10 of FIGS. 1-20 so as to allow air to flow out of (or into) the bottom portion 42 of the frame 14. Air that travels underneath the frame 14 may be able to exit the frame 14 through passageways 80 created by the vents 74, which may enhance the aerodynamics of the bicycle seat 10. For example, the passageways 80 created by the vents 74 may provide for air to flow across the bottom of the frame 14 and then flow outside the frame 14 through the passageways 80.

The vents 74 of FIG. 21 (such as the dimensions, positioning, features, and characteristics of the vents 74 of FIG. 21) may be substantially similar to the vents 74 of FIGS. 1-20. The passageways 80 of FIG. 21 (such as the dimensions, positioning, features, and characteristics of the passageways 80 of FIG. 21) may be substantially similar to the passageways 80 of FIGS. 1-20.

Additionally, the vents 74 and passageways 80 of FIG. 21 may have the following dimensions, positioning, features, and characteristics:

A=0.423 inches [10, 74]
B=1.000 inches [25, 4]
C=1.258 inches [31, 95]
D=65 degrees
E=1.215 inches [30, 86]
F=4×R 0.075 inches [1, 91]
Passageway area=0.392 square inches [253 square mm], 2 places These dimensions, positioning, features, and characteristics are only exemplary. Furthermore, one or more (or all) of these dimensions, positioning, features, and characteristics may vary by +/−5%, 10%, or 15%.

Any of the bicycle seats of FIGS. 1-20 may include the vent(s) 74 and/or passageway(s) 80 of FIG. 21 (and/or any of their lengths, angles, dimensions, and characteristics). Furthermore, any of the bicycle seats of FIGS. 1-20 may include any of the components and/or features discussed above with regard to any of the other bicycle seats, vents, and/or passageways of FIGS. 1-21.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A saddle, comprising:
   a bicycle seat having a front end section, a medial section, and a rear end section, the front end section extending forward from the medial section, the rear end section extending aft from the medial section;
   a first vent positioned in a first side portion of the rear end section, the first vent defining a first passageway that extends outwardly through the first side portion of the rear end section in a direction that at least partially faces rearward of the rear end section;
   a second vent positioned in a second side portion of the rear end section, the second vent defining a second passageway that extends outwardly through the second side portion of the rear end section in a direction that at least partially faces rearward of the rear end section; and
   wherein the first passageway extends inwardly through the first side portion into a bottom portion of the bicycle seat, wherein the second passageway extends inwardly through the second side portion into the bottom portion of the bicycle seat.

2. The saddle of claim 1, wherein the front end section comprises a split nose.

3. The saddle of claim 1, further comprising a cover over the bicycle seat.

4. The saddle of claim 3, further comprising cushion under the cover.

5. The saddle of claim 1, wherein the rear end section defines a continuous surface.

6. The saddle of claim 1, further comprising:
   a first vent frame coupled in the first vent; and
   a second vent frame coupled in the second vent.

7. The saddle of claim 1, further comprising an attachment rail coupled to a bottom portion of the bicycle seat.

8. A saddle, comprising:
   a bicycle seat having a front end section, a medial section, and a rear end section, the front end section extending forward from the medial section, the rear end section extending aft from the medial section;
   one or more vents positioned within the bicycle seat, wherein each of the one or more vents defines a respective passageway that extends outwardly through a side portion of a rear end section of the bicycle seat in a direction that at least partially faces rearward of the rear end section; and
   wherein the respective passageway extends inwardly through the side portion into a bottom portion of the bicycle seat.

9. The saddle of claim 8, wherein the one or more vents comprises opposing vents.

10. The saddle of claim 8, further comprising a cover over the bicycle seat.

11. The saddle of claim 10, further comprising cushion under the cover.

12. A saddle, comprising:
    a bicycle seat having a front end section, a medial section, and a rear end section, the front end section extending forward from the medial section, the rear end section extending aft from the medial section;
    a first vent positioned in a first side portion of the rear end section, the first vent defining a first passageway that extends outwardly through the first side portion of the rear end section in a direction that at least partially faces rearward of the rear end section;
    a second vent positioned in a second side portion of the rear end section, the second vent defining a second passageway that extends outwardly through the second side portion of the rear end section in a direction that at least partially faces rearward of the rear end section;
    a first vent frame coupled in the first vent; and
    a second vent frame coupled in the second vent.

13. The saddle of claim 12, wherein the first passageway extends inwardly through the first side portion into a bottom portion of the bicycle seat, wherein the second passageway extends inwardly through the second side portion into the bottom portion of the bicycle seat.

14. The saddle of claim 13, wherein the first passageway extends inwardly through the first side portion in a direction that at least partially faces forward of the rear end section, wherein the second passageway extends inwardly through the second side portion in a direction that at least partially faces forward of the rear end section.

15. The saddle of claim 14, wherein the first vent is indented against the first side portion and the second vent is indented against the second side portion.

16. The saddle of claim 15, wherein the first vent is positioned longitudinally in line with the second vent.

17. The saddle of claim 15, wherein the first and second vents each have a furthest forward point that is positioned at a location between $7/10$ and $9/10$ of a total length of the bicycle seat.

18. The saddle of claim 15, wherein the first and second vents are each shaped as an irregular triangle with curved vertices.

19. The saddle of claim 15, wherein the first and second vents are each shaped as a sideways teardrop.

20. The saddle of claim 15, wherein the first and second vents are each shaped as a polygon having curved corners.

\* \* \* \* \*